(12) United States Patent
Vilain et al.

(10) Patent No.: US 7,880,426 B2
(45) Date of Patent: Feb. 1, 2011

(54) POLYPHASE VOLTAGE CONVERTER CONTROL METHOD

(75) Inventors: Jean-Paul Vilain, Melicocq (FR); Julien Hobraiche, Compiegne (FR)

(73) Assignee: Valeo Equipements Electriques Moteur, Creteil (FR)

( * ) Notice: Subject to any disclaimer, the term of this patent is extended or adjusted under 35 U.S.C. 154(b) by 381 days.

(21) Appl. No.: 12/097,298

(22) PCT Filed: Dec. 13, 2006

(86) PCT No.: PCT/FR2006/051346

§ 371 (c)(1),
(2), (4) Date: Jul. 14, 2008

(87) PCT Pub. No.: WO2007/074267

PCT Pub. Date: Jul. 5, 2007

(65) Prior Publication Data

US 2008/0266918 A1    Oct. 30, 2008

(30) Foreign Application Priority Data

Dec. 22, 2005  (FR) .................................. 05/13142

(51) Int. Cl.
*H02P 27/04*  (2006.01)

(52) U.S. Cl. ...................... 318/801; 318/800; 318/799; 318/798; 318/767

(58) Field of Classification Search .................. 318/801, 318/800, 799, 798, 767
See application file for complete search history.

(56) References Cited

U.S. PATENT DOCUMENTS 5,910,892 A * 6/1999 Lyons et al. .................. 363/98
6,005,783 A * 12/1999 Xue et al. ..................... 363/36

* cited by examiner

*Primary Examiner*—Walter Benson
*Assistant Examiner*—David S Luo
(74) *Attorney, Agent, or Firm*—Berenato & White, LLC

(57) ABSTRACT

A method for driving a power bridge (1) which is used for controlling a multiphase electric load (3), connectable to said electric load (3) via several arms and drivable by switching functions which determine free wheel controlling vectors and are active for controlling the load. The inventive method consists in selecting a first switching function production method which produces a reduced number of combinations of switching functions corresponding to the free wheel control vectors or a second switching function production method which produces combinations of switching functions corresponding only to the active control vectors, wherein said method are defined according to a given reference voltage vector and in applying said selected for producing a sequence of control vectors from the produced combinations of switching functions.

27 Claims, 7 Drawing Sheets

POLYPHASE VOLTAGE CONVERTER CONTROL METHOD

CROSS-REFERENCE TO RELATED APPLICATIONS AND CLAIM TO PRIORITY

This application relates to International Application No. PCT/FR2006/051346 filed Dec. 13, 2006 and French Patent Application No. 05/13142 filed Dec. 22, 2005, of which the disclosures are incorporated herein by reference and to which priority is claimed.

FIELD OF THE INVENTION

The invention concerns a method of controlling a power bridge intended to control an electrical load comprising several phases, the power bridge being intended to be connected to the electrical load via several arms, at least one per phase, and being intended to be controlled by switching functions, the said switching functions determining control vectors for controlling the load, the said control vectors being subdivided into freewheeling control vectors and active control vectors.

The present invention finds particularly advantageous but not exclusive applications in the fields of the automobile sector and the aeronautic sector.

It also concerns a device implementing the said method of controlling the power bridge and a rotary electrical machine comprising such a device.

PRIOR ART

Generally a polyphase voltage power bridge is used for driving a polyphase electrical load. These electrical loads are for example reversible machines such as alternator starters. The bridge is connected upstream to a DC supply source and connected downstream to the phase windings of the polyphase load. The power bridge is supplied with energy by the DC supply source in motor mode and by the alternator starter in alternator mode.

The power bridge comprises several bridge arms each comprising for example two switches provided with freewheeling diodes. This type of bridge is a two-level bridge. The mid-point of each pair of switches on the same bridge arm is connected to a phase winding of the load. The control logic makes it possible to control the switches on one and the same bridge arm.

At the present time it is possible to generate several combinations of switches on the bridge arms, with which it is possible to associate a vectorial representation of the output voltages of the inverter, which will be termed control vectors of the power bridge. These control vectors are composed of active vectors and freewheeling vectors.

In the prior art, various types of techniques are known for controlling a polyphase inverter, among which is the document by A M Hava, R J Kerkman and T A Lipo, "*A high performance generalized discontinuous pwm algorthim*", IEEE Trans on Industry Applications Vol 34 (No 5) September/October 1998. This document describes control techniques using in particular discontinuous pulse width modulation strategies, controlling on the one hand the downstream part of the power bridge and on the other hand the bridge itself.

These control techniques inhibit by turn one of the bridge arms of the power bridge over one electrical period. For this purpose, according to the pulse width modulation strategy employed, a quantity of neutral is determined for each voltage-current phase difference in a phase of the load. For each phase of the load, a modulant is determined and translated by adding a quantity of neutral. With these control techniques, a bridge arm is inhibited when its modulant is saturated at +1 or −1.

Such control techniques have drawbacks. This is because it is not possible to determine the quantity of neutral to be added to the modulants when the system is not in permanent mode. In addition, in permanent mode, this quantity of neutral is either calculated in line, which requires a fairly long calculation time, or tabulated, which gives rise to a high consumption of memory.

In addition, for these control techniques of the prior art cited, knowledge of the voltage-current phase difference in the polyphase load is necessary. However calculating and measuring this phase difference is very complex to implement.

Likewise, the numerical implantation of these techniques poses implementation problems. This is because during their implantation it is necessary to take account firstly of the many functioning points of the polyphase load (for example motor, alternator, starter with various speeds and torque of an alternator starter) in order to apply a corresponding optimum quantity of neutral; and secondly different strategies corresponding to each quantity of neutral applied. The algorithm for effecting the numerical implantation is thus lengthy and tedious to implement.

In addition, currently according to the document by Falker Renken, "*Analytical Calculation of the DC-Link Capacitor Current for Pulsed Three-Phase Inverters*", proceedings of EPE Power Electronics and Motion Control, Riga, Latvia, 2004, for stabilising the voltage on the upstream side of the power bridge, the said bridge comprises a decoupling capacitor upstream. This decoupling capacitor filters the input current of the power bridge, a current that undergoes high discontinuities. This decoupling capacitor has a high capacitance for keeping constant the input voltage of the power bridge and preventing oscillation effects. The physical size of the decoupling capacitor is very great. Thus such a decoupling capacitor poses problems of space requirements for applications in a restricted space.

The effective current in the decoupling capacitor represents the ripple of the source current about its mean value. In the prior art it is observed that the source current often makes bounces about the zero value, thus causing significant ripple. Currently, in the prior art, there exist no means of reducing the effective current of the decoupling capacitor so as to reduce these ripples.

Consequently the control techniques presented allow neither a reduction in the switching losses of the inverter nor a reduction in the effective current in the decoupling capacitor.

DISCLOSURE OF THE INVENTION

The aim of the invention is precisely to remedy the drawbacks of the techniques disclosed above. For this purpose, the invention proposes to modify the existing inverter control techniques for the purpose of minimising the switching losses in the bridge arms of the power bridge, reducing the effective current in the filtering capacitor and consequently stabilising the voltage upstream of the power bridge whilst keeping control of the polyphase load downstream of the power bridge.

More precisely, a first object of the invention relates to a method of controlling a power bridge, the said method comprising the steps of:

selecting a first method of producing switching functions that produces a reduced number of combinations of switching functions corresponding to freewheeling control vectors or a second method of producing switching functions that produces solely combinations of switching functions corresponding to active control vectors, the said methods being defined according to a given set voltage vector and comprising a step of determining a modulant associated with each arm of the bridge from scalar voltage set values, and applying said method of producing switching functions selected to produce a succession of control vectors from combinations of switching functions produced.

As will be seen in detail below, the invention proposes to use zero vectors or freewheeling vectors as little as possible. This is because, when the invention was implemented, the fact that bounces to zero of the current entering the power bridge are caused by the use of freewheeling vectors in the control of the polyphase load was revealed. Set voltage vectors are then decomposed, in sectors of a hexagon generated by active control vectors. Through the vectorial position of a set voltage vector, it is deduced therefrom whether a comparison is made of the translated modulants with a single carrier or a double carrier. From this comparison, the control orders of the bridge arms of the power bridge are deduced. The use of the double carrier guarantees the non-use of freewheeling vectors in a specific area of the hexagon. Thus the use of the said freewheeling vectors is reduced.

Thus the first method makes it possible in fact to inhibit a bridge arm in a given state and therefore to reduce the switching losses since one of the arms no longer switches any current. The second method also makes it possible to limit the effective current in the decoupling capacitor.

According to non-limitative embodiments, the method according to the invention comprises the following additional characteristics:

The selection of a method of producing switching functions is based on a positioning of a set voltage vector in an area of a zone of the plane defined by control vectors, the set voltage vector being determined from set scalar voltage values. Thus, by dividing the hexagon into several subparts, an optimum method among the two previous ones is chosen while ensuring generation on average of the set voltage vector necessary for correct control of the electrical load downstream.

The field of the plane is divided into first and second zones and in that the first method of producing switching functions is selected if the set voltage vector is positioned in the first zone, and in that the second method of producing switching functions is selected if the set voltage vector is positioned in the second zone. Thus, by dividing the hexagon into only two parts, locating the set voltage vector in the zones is simple.

The field of the plane is divided into first, second and third zones and in that the first method of producing switching functions is selected if the set voltage vector is positioned in the first zone. Thus, by dividing the hexagon into three, detection of the zone in which the set voltage vector is situated is slightly more complex but the reduction in losses is greater.

The field of the plane is divided into first, second and third zones and in that the second method of producing switching functions is selected if the set voltage vector is positioned in the second zone or third zone.

A method of producing switching zones comprises a step of comparing translated modulants translated by a quantity of neutral with a carrier, a modulant being associated with each arm, the said comparison defining switching functions for controlling the said bridge. Thus a method of comparing translated modulants with a carrier makes it possible to easily and quickly define the changes in the switching functions that will control the inverter. In addition it is a method that can be used on signal processors dedicated to electrical machine control.

The method of producing switching functions is the first method of producing switching functions and the carrier is a single carrier. Thus the single carrier is simple to implement and in general it is present natively in dedicated electrical machine control processors.

The method of producing switching functions is the second method of producing switching functions and the carrier is a double carrier. Thus the double carrier makes it possible to change the decomposition triangle of the set voltage vector and, in certain areas of the hexagon, may lead to the non-use of the freewheeling vectors. The direct consequence is the reduction in the ripple of the source current about its mean value and consequently reduction in the effective current in the decoupling capacitor.

A double carrier comprises two single carriers and in that at least one modulant is compared with only one of the carriers of the double carrier.

A single carrier is an isosceles triangle comprising a vertex situated at a maximum value and a base situated at a minimum value. Thus a waveform of the isosceles triangle carrier type guarantees centering of the control pulses about the chopping half period, which is known to reduce the degree of harmonic distortion of the phase currents in the load.

A modulant is determined according to an intersective strategy. Thus the calculation of the modulants by a strategy of the intersective type is the most natural since there is then a simple relationship easily achievable on a single processor.

A modulant is determined according to a barycentric strategy. A good number of current variators already calculate modulants in this way. It is then possible to naturally and rapidly adapt the method to what exists in the existing control logic.

A method of producing switching functions also comprises a step of inhibiting a bridge arm throughout a chopping period of the power bridge. Thus the inhibition of a bridge arm makes it possible to gain the switching losses caused in it if it had been caused to switch during the chopping period. By choosing, in certain zones, the inhibitable bridge arm in which the current is maximum in absolute value, an optimum choice is made making it possible to have a maximum gain in terms of switching losses.

The field of the plane is defined in a stator reference frame, the said stator reference frame being divided into angular sectors, and in that a method of producing switching functions also comprises a step of determining a bridge arm to be inhibited in a high state or a low state according to the position of the set voltage vector in one of the angular sectors.

Thus,
if the set voltage vector is in a first angular sector then the first arm is inhibited at the high state,
if the set voltage vector is in a second angular sector then the third arm is inhibited at the low state,
if the set voltage vector is in a third angular sector then the second arm is inhibited at the high state,
if the set voltage vector is in a fourth angular sector then the first arm is inhibited at the low state, If the set voltage vector is in a fifth angular sector then the third arm is inhibited at the high state, if the set voltage vector is in a sixth angular sector then the second arm is inhibited at the low state.

The second zone determines internal triangles and in that a method of producing switching functions also comprises a step of determining an arm to be inhibited in a high state or a low state according to the position of the set voltage vector in one of the internal triangles.

Thus, if the set voltage vector is in a first internal triangle then the first arm is inhibited at the high state, if the set voltage vector is in a second internal triangle then the third arm is inhibited at the low state, if the set voltage vector is in a third internal triangle then the second arm is inhibited at the high state, if the set voltage vector is in a fourth internal triangle then the first arm is inhibited at the low state, If the set voltage vector is in a fifth internal triangle then the third arm is inhibited at the high state, if the set voltage vector is in a sixth internal triangle then the second arm is inhibited at the low state.

A method of producing switching functions also comprises a step of selecting at least two bridge arms able to be inhibited according to an order relationship. Thus there is a choice between two bridge arms to be inhibited and it will also be possible to use a double-carrier system for reducing the effective current in the decoupling capacitor.

The order relationship is a comparison between the modulants associated with the bridge arms.

The bridge arms selected correspond to the bridge arms having the most important modulant and the least important modulant.

The bridge arm to be inhibited is chosen from the bridge arm selected and is the one that comprises a highest phase current in absolute value among the phase currents corresponding respectively to a largest of the modulants and a smallest of the modulants among the modulants associated with the bridge arms. Thus the establishment of an order relationship between the modulants and the comparison of currents in absolute value are elementary calculations simple to make on a signal processor. They make it possible in fact to determine with exactitude the optimum bridge arm to be inhibited in order to economise on the maximum of switching losses.

If the bridge arm to be inhibited is the one corresponding to the largest of the modulants, then the bridge arm is inhibited at the high state, and if the bridge arm to be inhibited is the one corresponding to the smallest of the modulants, then the bridge arm is inhibited at the low state.

A method of producing switching functions also comprises a step of determining a quantity of neutral to be added to a modulant according to a high or low state of a bridge arm to be inhibited.

Thus, if an arm is to be inhibited at the high state then the quantity of neutral is equal to a first maximum value minus the modulant associated with the said arm, and if the arm is to be inhibited at the low state then the quantity of neutral is equal to a second minimum value minus the modulant associated with the said arm.

A second object of the invention relates to a device for controlling a power bridge intended to be connected to an electrical load via a bus for implementing the said method according to any one of the above characteristics, characterised in that it comprises a control logic, the power bridge being intended to be connected to a control logic, the control logic implementing the said method.

A third object of the invention relates to a rotary electrical machine comprising:

a polyphase electrical load, a voltage source, a power bridge intended to be connected downstream to the electrical load via a bus, and upstream to the voltage source, a decoupling capacitor being disposed in parallel to the bus, and a device for controlling the power bridge according to the second object.

The decoupling capacitor is situated close to the power bridge and is of low capacitance.

BRIEF DESCRIPTION OF THE DRAWINGS

The invention will be better understood from a reading of the following description and an examination of the figures accompanying it. These are presented by way of indication and are in no way limitative of the invention. The figures show.

DETAILED DESCRIPTION OF EMBODIMENTS OF THE INVENTION

Figure 1A:
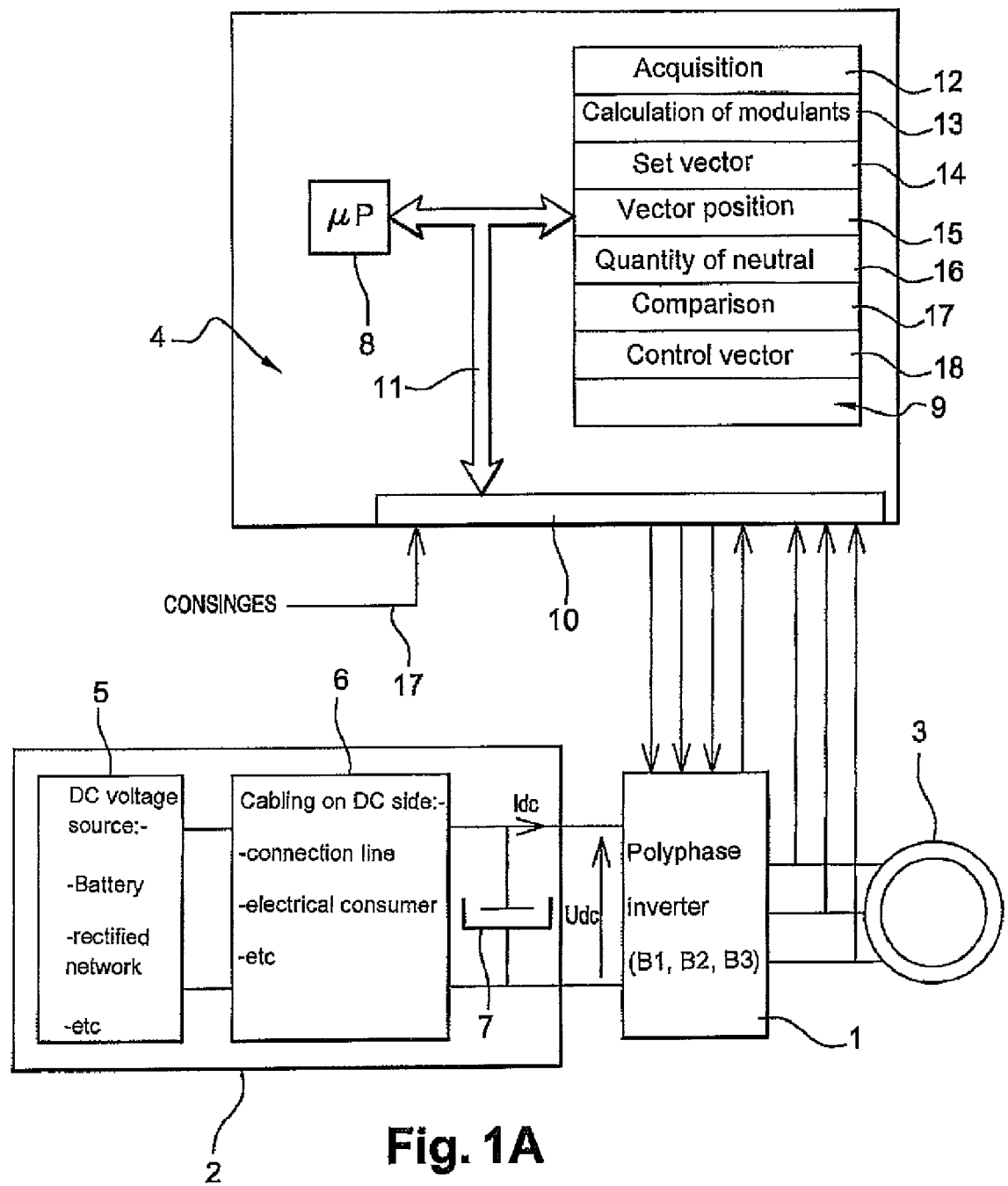
FIG. 1a: an illustration of means implementing the method, according to the invention.

FIG. 1a shows a polyphase power bridge 1 connected upstream to a DC bus 2 and downstream to a polyphase load 3 and controlled by control vectors produced by control logic 4. The power bridge 1 is an electrical device that is intended to convert a DC voltage into several sinusoidal voltages, one per phase when the associated load is functioning in motor mode. It is then called an inverter. In alternator (generator) mode, the power bridge converts sinusoidal phase voltages into DC voltage in order to supply a consumer such as a battery. It is then referred to as a controlled bridge rectifier. The power bridge 1 comprises several bridge arms (not shown). Each bridge arm consists of several switches INT controllable electronically.

In other words, the inverter is a DC to AC converter. On the alternating side a polyphase load is placed. On the DC side there is the DC bus. It is necessary to supply energy to the polyphase load, it must come from the DC bus (motor mode).

In alternator mode, it is the polyphase load that supplies energy to the DC bus. The polyphase load is therefore a reversible energy source, one characteristic of which is a DC voltage at its terminals.

For the rest of the description, a two-level three-phase power bridge is taken as a non-limitative example, knowing that it can be replaced by other types of existing power bridges such as, in a non-limitative example, a three-level three-phase inverter, this then having three freewheeling vectors available.

In the rest of the description, the case is adopted where the power bridge is an inverter. Naturally everything that is described in the remainder of the description for the inverter also applies to a bridge rectifier except for the difference between an inverter and a bridge rectifier that has just been mentioned above.

The inverter 1 is then a three-phase inverter controlling the load 3. It therefore comprises three bridge arms B1, B2 and B3. Each bridge arm comprises, in a non-limitative example, two switches INT bidirectional in terms of current, provided with freewheeling diodes. For example, the first arm comprises the high INT11 and low INT12 switches, the second arm the high INT21 and low INT22 switches, and the third arm the high INT31 and low INT32 switches.

The DC bus 2 comprises a DC voltage source 5. This DC voltage source 5 is, in a preferred example, a battery or a rectified network. This voltage source 5 supplies the inverter 1. In the example in FIG. 1a, devices 6, which are in particular connection lines and/or electrical consumers, are connected in series and/or in parallel with the voltage source 5. These electrical consumers can, amongst other things, be, in the case of a motor vehicle, headlights, a radio, air conditioning, the list is not exhaustive.

The DC bus 2 also comprises a decoupling capacitor 7 connected in parallel to the voltage source 5. This capacitor 7 is preferably situated as close as possible to the inverter 1. This reduces the line inductance between the capacitor and the switches. In this way increasing the overvoltages at the time of switching of the switches and therefore breaking the switches is avoided.

The capacitor 7 is preferably of low capacitance. As will be seen in detail later in the description, this is due to a double-carrier strategy. The capacitance of the capacitor 7 is preferably reduced by 25% compared with the capacitances of the decoupling capacitors of the prior art. In a non-limitative embodiment, the capacitance of the capacitor 7 is around 500 microfarads for a stray inductance on the connection line of around 10 microHenrys and for a battery of 36 volts, 18 milliOhms. The current in the capacitor 7 represents the ripple part of the source current. The role of the capacitor 7 is to filter the source code entering the inverter. This enables the voltage source 5 to deliver only the mean value of the said source current to the inverter 1. Thus, because of the low capacitance of the capacitor thus obtained, it is not necessary to use capacitors with a high capacitance for unit volume such as electrochemical capacitors, which represent a lack of reliability, in particular in a high-temperature or humid environment. In addition, this thus avoids using capacitors with expensive technology.

The equipment combining the DC bus 2 and the inverter 1 is intended to supply the energy necessary for the functioning of the load 3. The inverter 1 is used for driving the load 3. The load 3 can, in non-limitative examples, be an asynchronous or synchronous inverter, etc. The mid-point of each pair of switches on the same bridge arm of the inverter 1 is connected to a phase of the load 3.

As will be seen in detail below, the inverter 1 is pulse width modulation controlled, normally referred to as PWM, or PWM in English "Pulse Width Modulation"), by the control logic 4. This type of control makes it possible to have a voltage supply with variable frequency and variable voltage level. It is therefore possible to adapt for each particular operating condition of the electrical load (for example, if in alternator mode, it is necessary to supply a certain amount of power for supplying consumers, it would be necessary to have a voltage vector of given norm, and rotating at a given speed), the value of the currents in the load and their frequencies. Consequently PWM control makes it possible to control the load precisely.

To control a polyphase inverter, the control logic 4 defines the open or closed state of all the switches of the inverter 1. Non-limitatively, the control logic 4 makes it possible to control the switches of one and the same bridge arm in a complementary manner. This makes it possible to avoid putting the supply source in short-circuit.

The opposition of control of the switches on the same bridge arm and the finite number of switches means that the number of possible configurations of the switches of the bridge arm are finite.

For the two-level three-phase inverter 1, it is possible to generate eight different configurations of the switches of the bridge arms. With each of these eight configurations it is possible to associate a vectorial representation of the output voltages of the inverter, which will be termed control vectors of the inverter. These control vectors are also referred to as output vectors of the inverter.

The control vector is a mathematical representation that represents the resultant of the actual voltages applied to the load 3. Among these configurations, six are active states $\vec{V1}$ to $\vec{V6}$ corresponding to an amplitude of the fixed control vector and distinguished by the phase, and two $\vec{V0}$ and $\vec{V7}$ are so called "freewheeling" states for which the amplitude of the control vector is 0 and its phase ($\phi$=arc tangent y/x) is not defined. It should be noted that the phase of the active vectors is defined as being the oriented angle between the alpha axis of a stator reference frame (defined in detail below) and the corresponding active vector. Thus, for $\vec{V1}$, the phase is equal to 0, the phase of $\vec{V2}$ is equal to 60°, etc.

In a non-limitative embodiment, a control vector produced by the control logic 4 comprises as many switching functions SC as the load 3 has phases. In the case of the example taken of a two-level three-phase inverter, complementary controlled, there are three switching functions SC for one control vector.

Figure 1B:
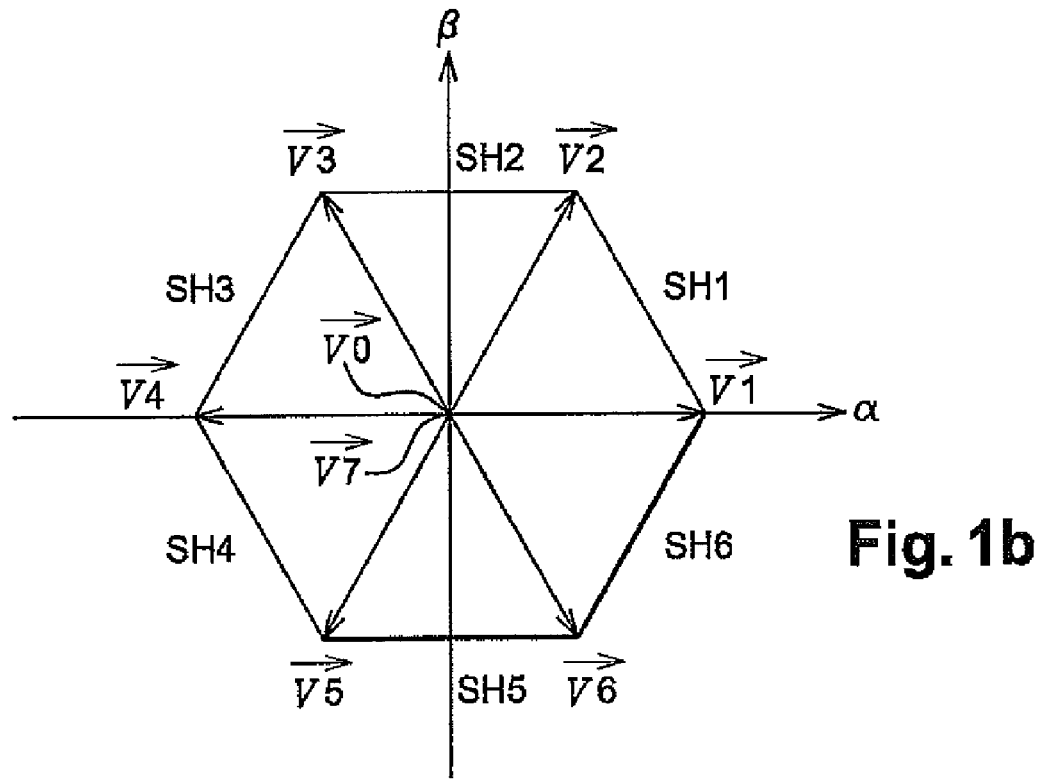
FIG. 1b: a representation of a stator reference frame used in the method of FIG. 1a, FIG. 2a: an illustration of the steps, in a first embodiment, of the method according to the invention.

The control vectors produced by the control logic 4 can be represented by a stator reference frame illustrated in FIG. 1b. The stator reference frame is a reference frame of fixed axes ($\alpha$, $\beta$) relating to the stator. The axis a is horizontal and the axis $\beta$ is vertical. The axis $\alpha$ is at 90° from the axis $\beta$. In a preferred example, the control vector $\vec{V1}$ is situated on the axis $\alpha$. The end of the active control vectors $\vec{V1}$ to $\vec{V6}$ form a hexagon. The centre of the hexagon is connected at each of its vertices by an active control vector. In a non-limitative embodiment, the active control vectors $\vec{V1}$ to $\vec{V6}$ are at 60° from one another. Thus the hexagon is broken down into six active sectors SH, each active sector being formed by two adjacent active centres and has its centre at the centre of the hexagon.

In one example, the first sector SH1 is represented by the control vectors $\vec{V1}$ and $\vec{V2}$ so on as far as the sixth sector SH6, which is represented by the control vectors $\vec{V6}$ and $\vec{V1}$, each of the vectors having three switching functions SC in the example taken.

The freewheeling control vectors $\vec{V0}$ and $\vec{V7}$ having a zero amplitude, are intersecting at the situation of the axis α and axis β. The intersection of the axis a and axis β is the centre of the stator reference frame, which is also the centre of the hexagon.

Thus, in one example, the switching functions SC of the said vectors are shown in the following table. There is correspondence between the combinations of the switching functions SC and the associated control vectors.

| Vector | SC1 | SC2 | SC3 |
|---|---|---|---|
| $\vec{V0}$ | 0 | 0 | 0 |
| $\vec{V1}$ | 1 | 0 | 0 |
| $\vec{V2}$ | 1 | 1 | 0 |
| $\vec{V3}$ | 0 | 1 | 0 |
| $\vec{V4}$ | 0 | 1 | 1 |
| $\vec{V5}$ | 0 | 0 | 1 |
| $\vec{V6}$ | 1 | 0 | 1 |
| $\vec{V7}$ | 1 | 1 | 1 |

With "0" corresponding to a command to close the low switch of a bridge arm and to a command to open the high switch of the same bridge arm; and "1" corresponding to a command to open a low switch of a bridge arm and to a command to close the high switch of the same bridge arm.

For example, if SC1=1, SC2=0 and SC3=0; the high switch INT11 of the first arm B1 is closed, the low switch INT12 of the first arm B1 is open, the high switch INT21 of the second arm B2 is open, the low switch INT22 of the second arm B2 is closed, and finally the high switch INT31 of the third arm B3 is open and the low switch INT32 of the third arm is closed.

The control logic 4, making it possible to control the switches of the inverter, is often produced in the form of an integrated circuit. In one example, FIG. 1a, this control logic 4 comprises:
- a microprocessor 8,
- a program memory 9,
- and an input output interface 10, the microprocessor 8, the memory 9 and the input output interface 10 being interconnected by a bus 11.

In practice, when an action is attributed to a device, this is performed by a microprocessor of the device controlled by instruction codes recorded in a program memory of the device. The control logic 4 is such a device.

The programme memory 9 is divided into several areas, each area corresponding to instruction codes for performing a function of the device. The memory 9 thus comprises:
- an area 12 containing instruction codes for implementing the acquisition of the scalar voltage set values,
- an area 13 containing instruction codes for carrying out a calculation of modulants according to the strategy chosen (barycentric or intersective), as will be seen in detail below,
- an area 14 containing instruction codes for determining a set voltage vector according to set scale and voltage values V1*, V2*, V3*, which are the voltages which it is wished to apply to the load 3,
- an area 15 containing instruction codes for determining the vectorial position of the set voltage vector $\vec{V^*}$ in the hexagon formed by the active control vectors,
- an area 16 containing instruction codes for determining a quantity of neutral,
- an area 17 containing instruction codes for making a comparison between a carrier or a double carrier, a carrier making it possible to generate variable-width pulses according to one or more modulants and the translated modulants of a given quantity of neutral,
- an area 18 containing instruction codes for making an election of control vectors $\vec{V0}$ to $\vec{V7}$ from this comparison and an application of said control vectors to the inverter 1.

Moreover, in addition to the decomposition into active sectors SH as seen previously, the hexagon is subdivided into N zones, N being an integer number. As will be seen in detail below, in order to eliminate to the maximum possible extent the use of freewheeling vectors, the set voltage vector $\vec{V^*}$ is broken down in the appropriate zones. A succession of control vectors controlling the inverter 1 are chosen in a simplified manner while reducing the switching losses in the latter and also reducing the effective current in the decoupling capacitor 7 as well as the ripples of the voltage source.

Decomposition of the Hexagon into 2 Zones (N=2)

Figure 2A:
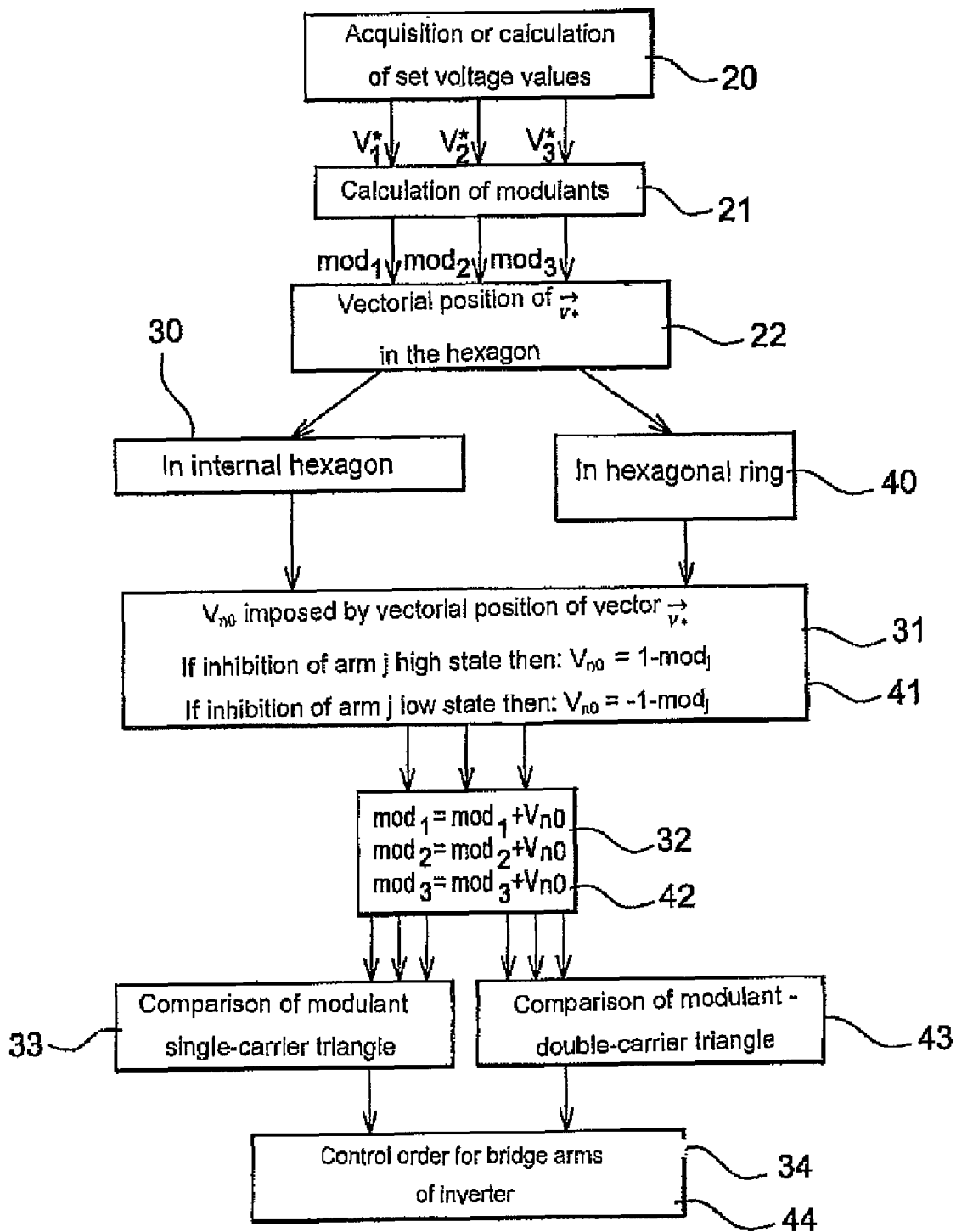
FIG. 2b: a representation of a stator reference frame used in the first embodiment of FIG. 2a, FIG. 2c: a representation of a vectorial position of a set voltage vector used during a step of the first embodiment in FIG. 2a, FIG. 3a: an illustration of the steps, in a second embodiment, of the method according to the invention.
Figure 2B:
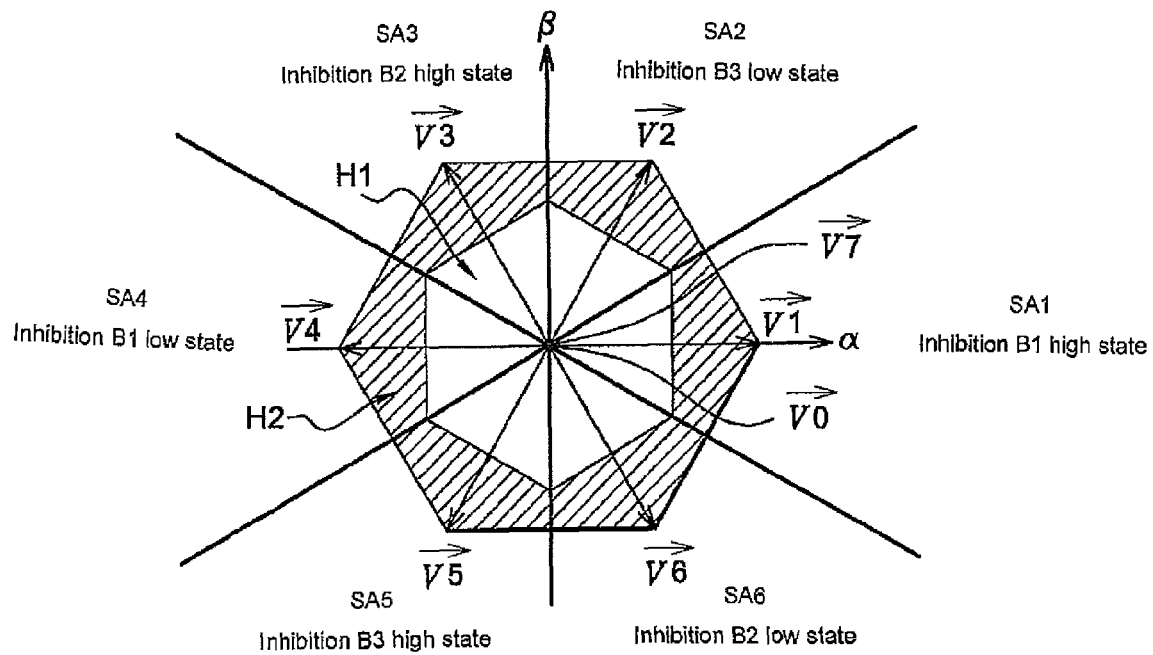

FIG. 2a shows an operating method for the means illustrated in FIG. 1a, when N=2. In this case, the hexagon comprises:
- a first zone, which is an internal hexagon H1 or a hexagonal internal zone, and
- a second zone, which is a hexagonal ring H2 surrounding the first internal hexagon zone as illustrated in FIG. 2b or a hexagonal ring zone.

In addition, the stator reference frame can be subdivided into angular sectors SA. Each angular sector has its vertex at the centre of the stator reference frame and forms an angel of 60°. Each of the active control vectors cuts each of the angular sectors into two equal parts. The stator reference frame comprises six angular sectors SA. The first angular sector SA1 is cut into two equal parts by the control vector $\vec{V1}$ and so on as far as the sixth angular sector SA6, which is cut by the control vector $\vec{V6}$.

The method for determining the control orders of the inverter when N=2 is implemented in the following manner as illustrated in FIG. 2a.

In a first step 20), the control logic 4 acquires the three scalar voltage set values V1*, V2* and V3* of each of the three arms of the inverter B1, B2, B3. These three scalar voltage set values V1*, V2* and V3* are the voltages to be applied to the load 3. These three scalar voltage set values V1*, V2* and V3* can be measured or calculated by the control logic 4.

These set values can therefore be calculated internally by the control logic (management for example of the regulation loop for the phase currents of the load in the control logic). It is also possible to have a supervision control logic that supplies the set voltages to the control logic 4 by means of a serial, parallel or CAN link. It will then be necessary for the control logic 4 to measure the information supplied by the supervisor.

In a second step 21), the control logic 4 determines, for each bridge arm of the inverter 1, a corresponding modulant mod1, mod2 and mod3. The control logic 4 can determine the modulants of the three bridge arms in several ways (non-limitative intersective strategy or barycentric strategy), as will be seen in detail below, the said modulants being a function of the scalar voltage set values. It should be noted that a modulant represents a value standardised with respect to the DC bus voltage of the scalar voltage set value of a bridge arm of the inverter. The modulant-triangle intersection will supply the PWM control orders of the bridge arm, as will be seen in detail below.

Intersective Strategy

In a first non-limitative embodiment, the control logic can calculate the modulants according to an intersective strategy. In this case, the control logic 4 measures or estimates the voltage of the DC bus $U_{DC}$, preferably close to the inverter 1 in order to obtain the actual voltages available at the terminals of the said inverter 1. The control logic 4 determines the modulant of each phase of the load 3. The modulant is associated with each bridge arm. This modulant is in a non-limitative example a standardised value of a scalar voltage set value with respect to the source voltage $U_{DC}$. Thus, for each of the three scalar voltage set values V1*, V2* and V3*, the control logic 4 determines respectively the three modulants mod1, mod2 and mod3.

Thus the standardisation takes place in the following manner:

$$\text{Mod} = \frac{\text{Max} - \text{Min}}{U_{DC}} V^* + \text{Min}$$

Max being the highest value reached by a triangular carrier, which will be defined subsequently, Min being the lowest value achieved by the triangular carrier.

Which gives, with a value Min=−1 and Max=1:

$$\text{Mod} = \frac{2 \cdot V0^*}{U_{DC}} - 1$$

Thus $$\text{Mod1} = \frac{2 \cdot V1^*}{U_{DC}} - 1$$

$$\text{Mod2} = \frac{2 \cdot V2^*}{U_{DC}} - 1$$

$$\text{Mod3} = \frac{2 \cdot V3^*}{U_{DC}} - 1$$

Thus in this case, the voltage Vs applied at the output of the bridge arm is equal to the bridge arm command multiplied by the DC voltage $U_{DC}$.

Thus, for each of the three scalar voltage set values V1*, V2* and V3*, the control logic 4 determines respectively the three modulants mod1, mod2 and mod3.

Barycentric Strategy

In a second non-limitative embodiment, the control logic 4 can determine the modulants mod1, mod2 and mod3 according to a barycentric strategy. According to this strategy, two active control vectors and the two freewheeling vectors are used over a control period for the inverter 1 in order to decompose the set voltage vector $\vec{V^*}$. To do this, the control logic 4 applies first of all the step 22, before determining the three modulants mod1, mod2 and mod3 at step 21. It should be noted that the control period for the inverter represents the interval of time where an opening and closing of the high switch of the bridge arm will be controlled (the control of the switch is complementary). A chopping period is also spoken of.

Firstly, the control logic 4 determines, from the three scalar voltage set values V1*, V2* and V3*, a set voltage vector $\vec{V^*}$. The control logic 4 can determine the set voltage vector $\vec{V^*}$ according to a "Clarke" transformation known to persons skilled in the art. In this case, the control logic 4 calculates the two components V*x and V*y of the set voltage vector $\vec{V^*}$ according to the following formulae:

$$V^*x = \frac{2}{3}\left(V1^* - \frac{1}{2} \times V2^* - \frac{1}{2} \times V3^*\right)$$

and $$V^*y = \frac{2}{3}\left(\frac{1}{2}\sqrt{3} \times V2^* - \frac{1}{2}\sqrt{3} \times V3^*\right)$$

It should be noted that naturally other transformations can be used such as the "Concordia" transformation known to persons skilled in the art. It is differentiated by the standardisation factor.

At step 22, the control logic 4 controls the vectorial position of the set voltage vector $\vec{V^*}$ in the hexagon formed by the control vectors $\vec{V0}$ to $\vec{V7}$ and more particularly the position of the set voltage vector in one of the active sectors SH.

This set voltage vector $\vec{V^*}$ is situated at any time in one of the six active sectors SH of the hexagon.

Thus, in order to determine its position, the phase of the set voltage vector that is equal to a tan(V*y/V*x) is calculated. Next, this value is compared with the phase of the active voltage vectors. For example, if 0<the phase of the set voltage vector<60° then the set voltage vector is situated in the first sector.

Figure 2C:
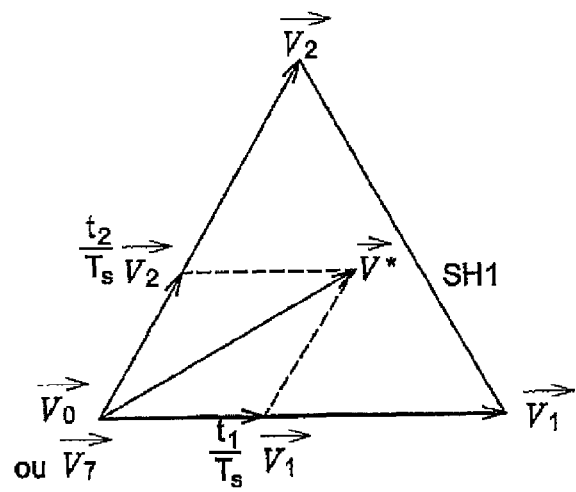

Next, the set voltage vector $\vec{V^*}$ is decomposed on the two adjacent active control vectors making up the active sector SH in which it is situated, as illustrated in FIG. 2c.

In one example, the set voltage vector $\vec{V^*}$ is decomposed on the two adjacent active control vectors $\vec{V1}$ and $\vec{V2}$ making up the active sector SH1 in which it is situated, illustrated in FIG. 2c.

This decomposition makes it possible to determine coefficients ti and tj such that $$\vec{V^*} = \left(\frac{ti}{Ts} \times \vec{Vi}\right) + \left(\frac{tj}{Ts} \times \vec{Vj}\right)$$

where Ts is the period according to which the inverter is controlled and ti and tj correspond to the times of application of the adjacent active control vectors $\vec{Vi}$ and $\vec{Vj}$ over the period Ts, the said active control vectors defining the active sector SH in which the set voltage vector $\vec{V^*}$ is situated, as seen previously. The active sector SHN is defined by the adjacent active control vectors $\vec{VN}$ and $\vec{V}N+1$, i=1 to 5, and the active sector SH6 is defined by the adjacent active control vectors $\vec{V6}$ and $\vec{V1}$.

Once the application times ti and tj are known, i.e. after the decomposition of the set voltage vector $\vec{V^*}$ in the active sector SH of the hexagon in which it is situated, the control logic 4 determines the three modulants mod1, mod2 and mod3 for the active sector SH concerned according to the times of application of the control vector and the control period of the inverter 1 by means of the following table:

|       | Sector SH1 | Sector SH2 | Sector SH3 |
|-------|------------|------------|------------|
| mod1  | (Max − Min)/Ts * (t1 + 12 + t0/2) + Min | (Max − Min)/Ts * (t2 + t0/2) + Min | (Max − Min)/Ts * (t0/2) + Min |
| mod2  | (Max − Min)/Ts * (t2 + t0/2) + Min | (Max − Min)/Ts * (t3 + 12 + t0/2) + Min | (Max − Min)/Ts * (t3 + 14 + t0/2) + Min |
| mod3  | (Max − Min)/Ts * (t0/2) + Min | (Max − Min)/Ts * (t0/2) + Min | (Max − Min)/Ts * (t4 + t0/2) + Min |
|       | Sector SH4 | Sector SH5 | Sector SH6 |
| mod1  | (Max − Min)/Ts * (t0/2) + Min | (Max − Min)/Ts * (t6 + t0/2) + Min | (Max − Min)/Ts * (t1 + 16 + t0/2) + Min |
| mod2  | (Max − Min)/Ts * (t4 + t0/2) + Min | (Max − Min)/Ts * (t0/2) + Min | (Max − Min)/Ts * (t0/2) + Min |
| mod3  | (Max − Min)/Ts * (t5 + 14 + t0/2) + Min | (Max − Min)/Ts * (t5 + 16 + t0/2) + Min | (Max − Min)/Ts * (t6 + t0/2) + Min |

The following table applies for Min=−1 and Max=1.

|       | Sector SH1 | Sector SH2 | Sector SH3 |
|-------|------------|------------|------------|
| mod1  | 2/Ts * (t1 + t2 + t0/2) − 1 | 2/Ts * (t2 + t0/2) − 1 | 2/Ts * (t0/2) − 1 |
| mod2  | 2/Ts * (t2 + t0/2) − 1 | 2/Ts * (t3 + t2 + t0/2) − 1 | 2/Ts * (t3 + t4 + t0/2) − 1 |
| mod3  | 2/Ts * (t0/2) − 1 | 2/Ts * (t0/2) − 1 | 2/Ts * (t4 + t0/2) − 1 |
|       | Sector SH4 | Sector SH5 | Sector SH6 |
| mod1  | 2/Ts * (t0/2) − 1 | 2/Ts * (t6 + t0/2) − 1 | 2/Ts * (t1 + t6 + t0/2) − 1 |
| mod2  | 2/Ts * (t4 + t0/2) − 1 | 2/Ts * (t0/2) − 1 | 2/Ts * (t0/2) − 1 |
| mod3  | 2/Ts * (t5 + t4 + t0/2) − 1 | 2/Ts * (t5 + t6 + t0/2) − 1 | 2/Ts * (t6 + t0/2) − 1 |

The time t0 represents the time of application of the free-wheeling vectors $\vec{V0}$ and $\vec{V7}$. The application time t0 is determined according to the active sector SH in which the set voltage vector $\vec{V^*}$ is situated. When the set voltage vector $\vec{V^*}$ is situated in the first active sector SH1 then t0=Ts−t1−t2. When it is in the second active sector SH2 then t0=Ts−t2−t3. And so on up to the sixth active sector SH6, where t0=Ts−t6−t1.

Naturally other strategies can be used in calculating modulants.

After having determined the modulants of each bridge arm according to an intersective or barycentric strategy, as described below, In a third step, the bridge arm to be inhibited is determined with respect to the position of the set voltage vector $\vec{V^*}$ in the hexagon and more particularly the sectorial position of the set voltage vector in one of the angular sectors SA of the stator reference frame. This third step is also performed by the control logic 4 at step 22.

It should be noted that the set voltage vector $\vec{V^*}$ is situated at all times in one of the angular sectors SA and in one of the zones H1 or H2 of the hexagon.

The sectorial position of the set voltage vector $\vec{V^*}$ in the stator reference frame determines the high state or low state of the bridge arm to be inhibited.

It should be noted that inhibiting a bridge arm means maintaining the said bridge arm in a given state. In other words the states of the switches of the said bridge arm remain unchanged. There is no switching of the arm.

The high state or low state of a bridge arm defines which of the two switches of the said bridge arm is conducting. This high state and low state are in general defined for convenience. In one non-limitative embodiment, the high state is defined when the switches situated at the top of each bridge arm of the inverter are closed. And the low state is defined when the same switches are open. Knowing the state of one of the two switches of a bridge arm automatically gives information on the state of the other switch of the said bridge arm, since their functioning is here complementary.

The bridge arm to be inhibited depends on the sectorial position of the set voltage vector $\vec{V^*}$ in the angular sectors SA of the stator reference frame, as follows:

if the set voltage vector $\vec{V^*}$? is in the first angular sector SA1 then the first arm B1 is inhibited at the high state, if the set voltage vector ?$\vec{V^*}$ is in the second angular sector SA2 then the third arm B3 is inhibited at the low state, if the set voltage vector $\vec{V^*}$ is in the third angular sector SA3 then the second arm B2 is inhibited at the high state, if the set voltage vector $\vec{V^*}$ is in the fourth angular sector SA4 then the first arm B1 is inhibited at the low state, if the set voltage vector $\vec{V^*}$ is in the fifth angular sector SA5 then the third arm B3 is inhibited at the high state, if the set voltage vector $\vec{V^*}$ is in a second angular sector SA4 then the second arm B2 is inhibited at the low state.

In a fourth step 30 or 40) it is determined whether the set vector $\vec{V^*}$ situated in the internal hexagonal zone H1 or the ring hexagonal zone H2.

In a non-limitative example, it is possible to proceed as follows:

| Zones | Test on the modulants |
|-------|----------------------|
| H1    | $((Max + 5 \cdot Min)/6 < mod_1 < (5 \cdot Max + Min)/6)$ and $((Max + 5 \cdot Min)/6 < mod_2 < (5 \cdot Max + Min)/6)$ and $((Max + 5 \cdot Min)/6 < mod_3 < (5 \cdot Max + Min)/6)$ |
| H2    | $((mod_1 > (5 \cdot Max + Min)/6)$ or $(mod_1 < (Max + 5 \cdot Min)/6))$ or $((mod_2 > (5 \cdot Max + Min)/6)$ or $(mod_2 < (Max + 5 \cdot Min)/6))$ or $((mod_3 > (5 \cdot Max + Min)/6)$ or $(mod_3 < (Max + 5 \cdot Min)/6))$ |

With Max=+1 and Min=−1, there is obtained:

| Zones | Test on the modulants |
|-------|----------------------|
| H1 | $(-2/3 < mod_1 < 2/3)$ and $(-2/3 < mod_2 < 2/3)$ and $(-2/3 < mod_3 < 2/3)$ |
| H2 | $((mod_1 > 2/3)$ or $(mod_1 < -2/3))$ or $((mod_2 > 2/3)$ or $(mod_2 < -2/3))$ or $((mod_3 > 2/3)$ or $(mod_3 < -2/3))$ |

When the set voltage vector $\vec{V^*}$ is in the internal hexagon zone H1 then the control logic 4 applies steps 30 to 34. And when the set voltage vector $\vec{V^*}$ is in the hexagonal ring zone H2 then the control logic 4 applies steps 40 to 44.

Internal Hexagonal Zone H1: Single-Carrier Comparison

Thus, when the set voltage vector $\vec{V^*}$ is in the internal hexagon zone H1, the following steps are performed.

In a fifth step 31), the control logic 4 determines a quantity of neutral $V_{n0}$ to be injected in the modulants mod1, mod2 and mod3, according to the position of the set voltage vector $\vec{V^*}$ in the angular sectors SA of the stator reference frame.

When the bridge arm Bj is to be inhibited at the high state then the control logic determines a quantity of neutral $V_{n0}$=Max−modj. When the bridge arm Bj is to be inhibited at the low state then the control logic determines a quantity of neutral $V_{n0}$=Min−modj. In our example, Max=+1 and Min=−1 is taken.

In a sixth step 32), the control logic 4 translates the modulants mod1, mod2 and mod3 of this quantity of neutral $V_{n0}$ determined. This translation is an addition of the quantity of neutral $V_{n0}$ to the modulants mod1, mod2 and mod3.

Thus, for example, if the first arm B1 is to be inhibited at the high state, then the quantity of neutral $V_{n0}$ to be added to the three modulants mod1, mod2 and mod3 is equal to 1−mod1. In this way the value+1 is obtained for mod1 the value mod2+1−mod1 for mod2, and the value mod3+1−mod1 for mod3.

In a seventh step 33), the control logic 4 determines at least one carrier This carrier is a signal whose period is the period of the microprocessor 8 so as to be able to adjust the switching frequency of the switches of the bridge arms of the inverter 1, for example at 50 microseconds for a switching frequency of 20 kHz. The control logic 4 can also determine as many carriers as there exist bridge arms. In this case, each modulant of a bridge arm is compared with the corresponding carrier. In this way the succession of control vectors applied at the level of the order and application times is modified without modifying the total application time of each of the vectors.

In the example taken, the control logic 4 determines a single carrier for the three bridge arms. This carrier is a triangle so as to comply with linearity between a modulant and a mean value of the pulse generated on the arm corresponding to the control period Ts of the inverter 1. Thus the period Ts of this carrier is the period of the microprocessor 8.

Figure 4:
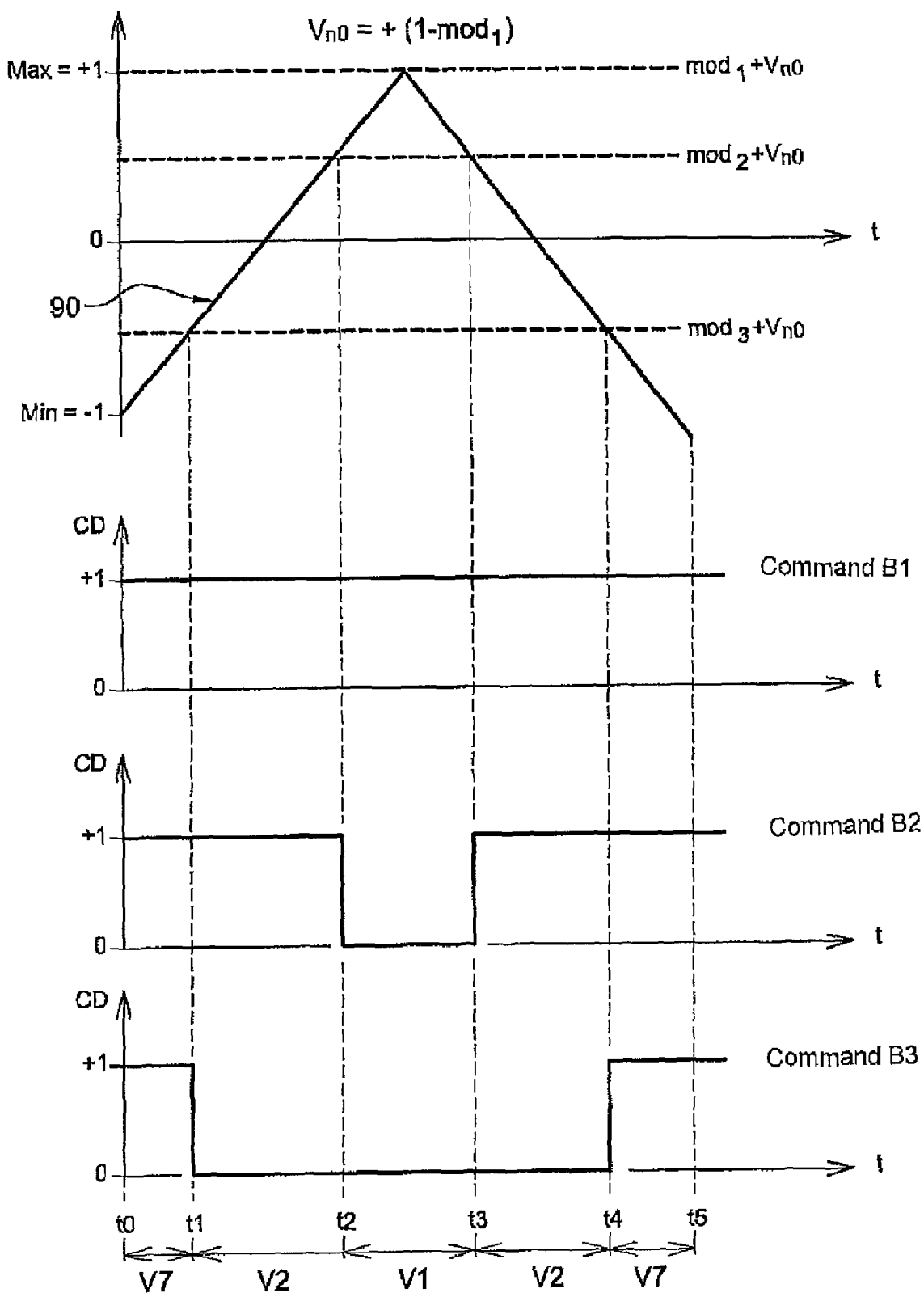

In the example taken in FIG. 4, this triangle is taken between a first maximum value Max, here =1, and a second minimum value Min, here =−1 respectively for the vertex and base.

In a first non-limitative variant this carrier is an isosceles triangle. This makes it possible to centre the pulses over half of the chopping period. In this way the harmonic distortions of the phase currents are reduced. Consequently the control of the load is more refined.

In addition, non-limitatively, the vertex points upwards, i.e. the vertex is situated at the first maximum value Max=+1 and the base is situated at the second minimum value Min=−1.

In a second variant, this carrier can be any triangle making it possible to modify, though not the width of the pulse, the position of the pulse in the period of the microprocessor 8.

In another variant, the carrier can be a succession of triangles whose period is the period of the microprocessor 8. This corresponds in fact to a regular sampling of the modulant.

Subsequently the control logic 4 compares the carrier with the three modulants mod1, mod2 and mod3 translated by the quantity of neutral $V_{n0}$. An example of the comparison is given in FIG. 4 and will be described later in the description (see paragraph on comparison with a single carrier described below for more detail).

According to this comparison, the control logic 4 determines, in an eighth step 34), the control orders SC (or more particularly the combinations of the control orders determining a succession of control vectors) to be applied for each of the three bridge arms of the inverter 1. This control orders SC are switching functions of the switches of the bridge arms.

This technique of movement of the quantity of neutral $V_{n0}$ thus makes it possible to reduces the stresses on the inverter 1 in terms of losses, by making a simple intersection between the new translated modulants. This reduction in the stresses on the inverter 1 limits the switching losses. This is because this technique makes it possible to inhibit a bridge arm.

It should be noted that, in the internal hexagon H1, the set voltage vector $\vec{V^*}$ is of low norm, the mean value of the source current is low and the obligatory use of a freewheeling vector is in no way detrimental to the effective value of the current in the filtering capacitor.

Hexagonal Ring Zone H2: Comparison with a Double Carrier

When the set voltage vector $\vec{V^*}$ is in the hexagonal ring zone H2, the following steps are performed.

At steps 41 and 42, the control logic 4 applies the same method at steps 31 and 32 in order to determine the quantity of neutral to be added to the modulants independently of the zones H where the set voltage vector $\vec{V^*}$ is situated.

In a seventh step 43), the control logic 4 determines a double carrier. This double carrier is formed from two signals, the period of which is the period of the microprocessor 8.

Figure 5:
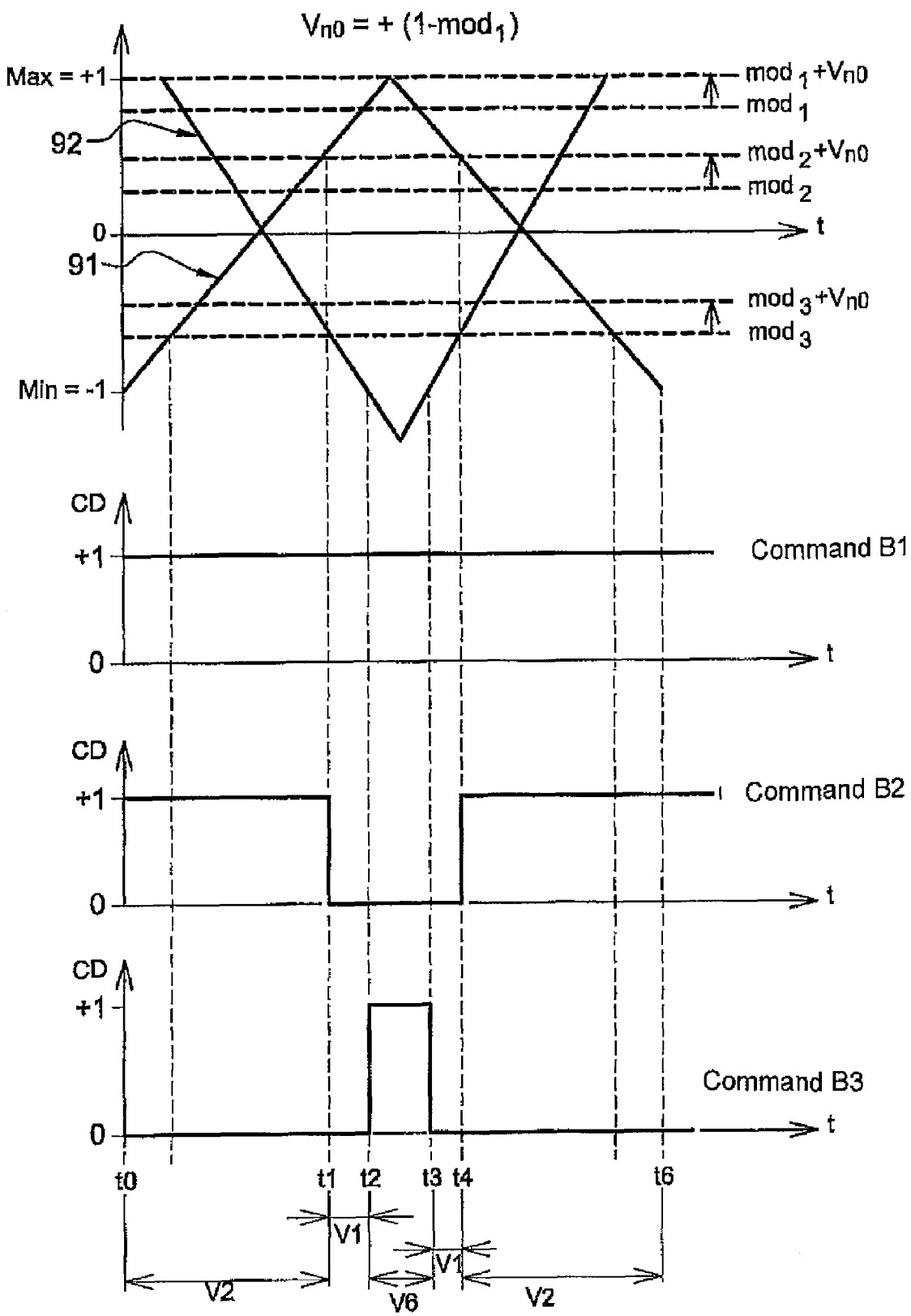
FIG. 5: an illustration of the comparison between the modulant and a double triangular-shaped carrier, according to the method of the invention.

In the example taken in FIG. 5, this double carrier comprises a first carrier in the form of a triangle, the vertex of which is situated at a first maximum value Max, and a second carrier in the form of a triangle, the vertex of which is situated at a second minimum value Min, the vertices of the first and second triangles being vertical to each other. In a first non-limitative variant, the first carrier and the second carrier are isosceles triangles. The period of these two carriers is the control period of the inverter 1.

In another variant, these two carriers can be formed by any two triangles making it possible to modify, though not the width of the pulse, the position of the pulse in the control period of the inverter.

Again, in another variant, these two carriers can be a succession of triangles.

As will be described in more detail in FIG. 5, the control logic 4 then compares each of the modulants not corresponding to the inhibited arm with only one of the two carriers (see paragraph on comparison with a double carrier described below for more detail).

According to this comparison, the control logic 4 determines, in an eighth step 44), the control orders SC (or more particularly the combinations of the control orders determining a succession of control vectors) for each of the three bridge arms of the inverter 1. These control orders SC are switching functions of the switches of the bridge arms.

The control logic 4 applies to the inverter the succession of control vectors representing the control orders, determined at step 44.

The use of a double carrier makes it possible to avoid using the freewheeling vectors, thus making it possible to reduce the effective value of the current in the filtering capacitor.

It should be noted that, by being limited to N=2, it is not necessary to measure the current in the phases of the machine, and this then saves on several current sensors. In addition, the location of the set voltage vector in the hexagon is simpler. This simplification of the algorithm has an effect on the non-optimum choice of the bridge arm to be inhibited and therefore a less pronounced reduction of the gains in terms of switching losses compared with the case N=3.

Breakdown of the Hexagon into 3 Zones (N=3)

Figure 3B:
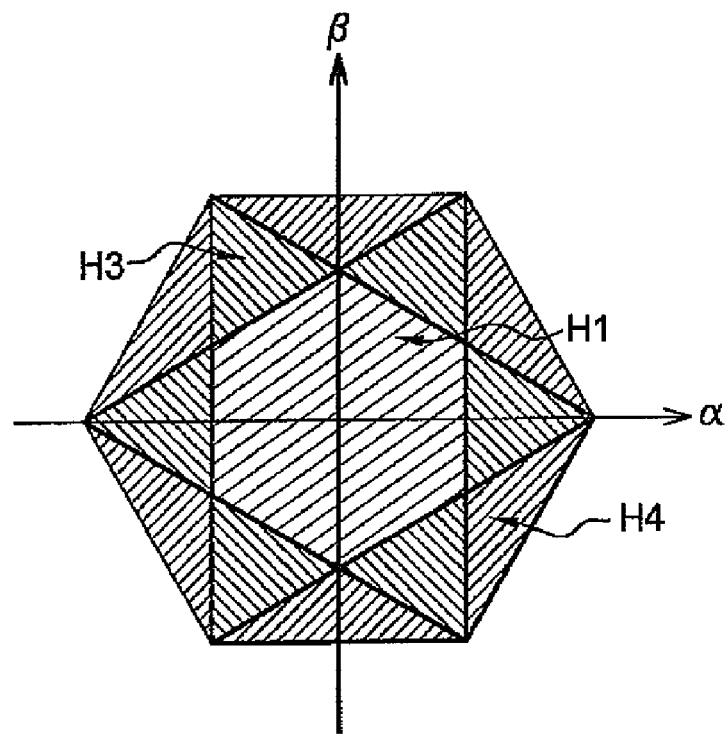
FIG. 3b: a representation of a stator reference frame used in the second embodiment in FIG. 3a, FIG. 4: an illustration of the comparison between the modulants and a single carrier of triangular form, according to the method of the invention.
Figure 3A:
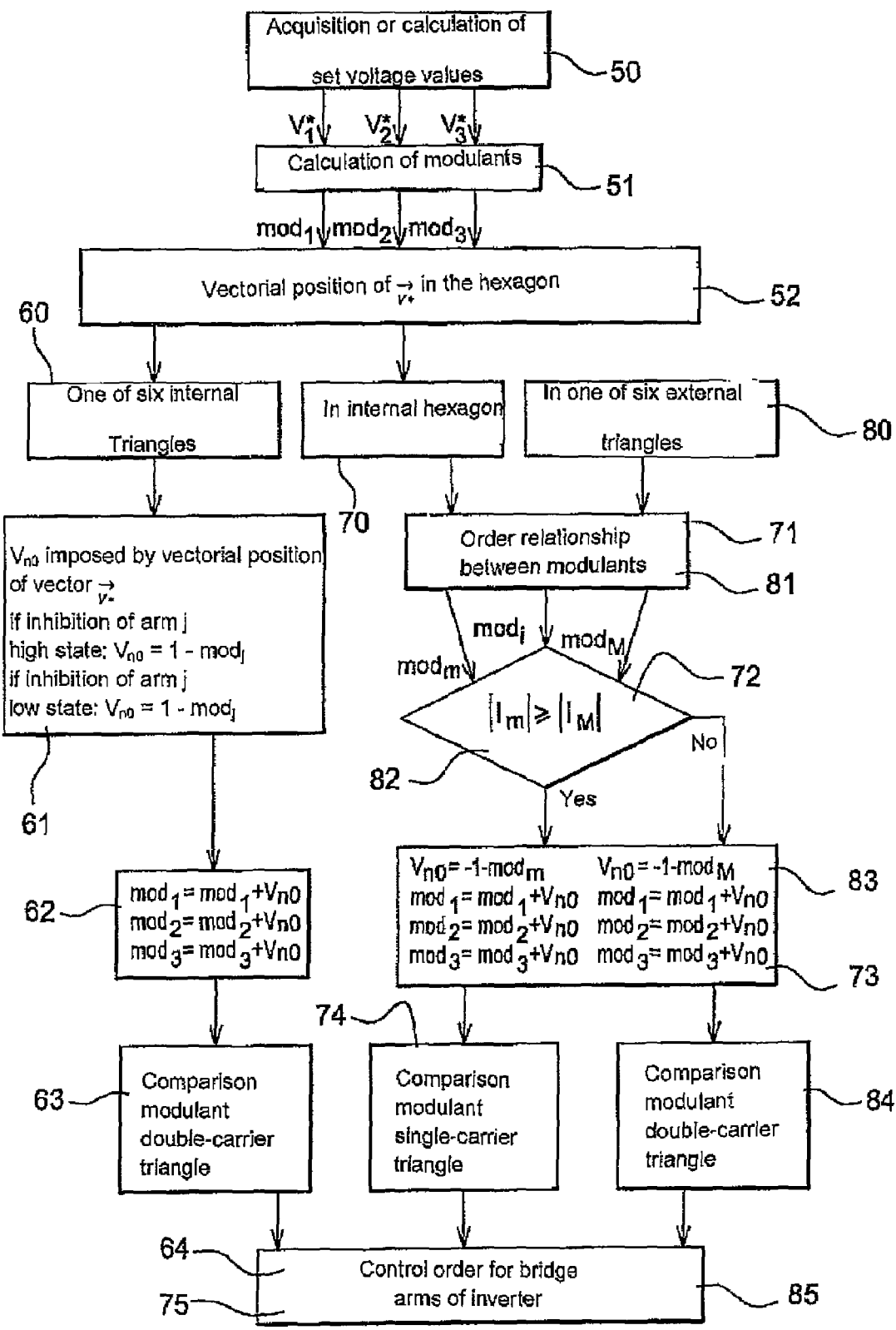

FIG. 3a shows a method according to the invention of functioning of the means illustrated in FIG. 1a when N=3. Increasing N makes it possible to reduce further the switching losses by making an optimal choice of the arm to be inhibited according to the position of a current vector $\vec{V^*}$ representing the phase currents in the load 3.

In this case, the hexagon comprises 3 zones as illustrated in FIG. 3b.

a first zone, which is an internal hexagon H1 surrounded by a hexagonal ring.
a second zone H3, which is composed of the intersection of the ring with the equilateral triangles formed by joining the vertices of the hexagon. This second zone H3 is the joining of triangles. In the example in FIG. 3b, the second zone is formed by 6 internal triangles TI, an internal triangle TIi being the one through which the control vector $\vec{V_i}$ passes, i ranging from 1 to 6.
A third zone H3, which is the complement of the second zone with the hexagonal ring. This third zone H1 is a joining of triangles. In the example in FIG. 3b, the third zone is formed by six external triangles TE. The base of an external triangle TEi is formed by the segment connecting the ends of the control vectors $\vec{V_i}$ and $\vec{V_{i+1}}$, i ranging from 1 to 5. And the base of the external triangle TE6 is formed by the segment connecting the ends of the control vectors $\vec{V_6}$ and $\vec{V_7}$.

The method for determining the control orders of the inverter when N=3 is implemented in the following manner as illustrated in FIG. 3a.

In a first step 50), the control logic 4 acquires the three scalar voltage set values V1*, V2* and V3* of each of the three arms of the inverter. In a non-limitative example these three scalar voltage set values V1*, V2* and V3* are the voltages to be applied to the load 3.

In a second step 51), the control logic 4 determines, for each bridge arm of the inverter 1, the corresponding modulant, by means of the intersective or barycentric strategy as seen previously in the example where N=2.

In a third step, the control logic 4 determines, from the three scalar voltage set values V1*, V2* and V3*, a set voltage vector $\vec{V^*}$ using for example the Clarke transformation as seen previously in the example where N=2.

In a fourth step 52), the control logic determines the position of the set voltage vector $\vec{V^*}$ in the hexagon. This set voltage vector $\vec{V^*}$ is at all times in one of the three zones of the hexagon H1, H3, H4.

In a non-limitative example, it is possible to proceed as follows:

| Zones | | Test on the modulants |
|---|---|---|
| H3 | TU | $(mod_1 > (5 \cdot Max + Min)/6)$ and $((Max + 5 \cdot Min)/6 < mod_2 < (Max + Min)/2)$ and $((Max + 5 \cdot Min)/6 < mod_3 < (Max + Min)/2)$ |
| | TI2 | $(mod_3 < (Max + 5 \cdot Min)/6)$ and $((Max + Min)/2 < mod_2 < (5 \cdot Max + Min)/6)$ and $((Max + Min)/2 < mod_1 < (5 \cdot Max + Min)/6)$ |
| | TI3 | $(mod_2 > (5 \cdot Max + Min)/6)$ and $((Max + 5 \cdot Min)/6 < mod_3 < (Max + Min)/2)$ and $((Max + 5 \cdot Min)/6 < mod_1 < (Max + Min)/2)$ |
| | TI4 | $(mod_1 < (Max + 5 \cdot Min)/6)$ and $((Max + Min)/2 < mod_3 < (5 \cdot Max + Min)/6)$ and $((Max + Min)/2 < mod_2 < (5 \cdot Max + Min)/6)$ |
| | TI5 | $(mod_3 > (5 \cdot Max + Min)/6)$ and $((Max + 5 \cdot Min)/6 < mod_1 < (Max + Min)/2)$ and $((Max + 5 \cdot Min)/6 < mod_2 < (Max + Min)/2)$ |
| | TI6 | $(mod_2 < (Max + 5 \cdot Min)/6)$ and $((Max + Min)/2 < mod_1 < (5 \cdot Max + Min)/6)$ and $((Max + Min)/2 < mod_3 < (5 \cdot Max + Min)/6)$ |
| H4 | TE1 | $(mod_1 > (5 \cdot Max + Min)/6)$ and $((Max + 5 \cdot Min)/6 < mod_2 < (5 \cdot Max + Min)/6)$ and $(mod_3 < (Max + 5 \cdot Min)/6)$ |
| | TE2 | $(mod_2 > (5 \cdot Max + Min)/6)$ and $((Max + 5 \cdot Min)/6 < mod_1 < (5 \cdot Max + Min)/6)$ and $(mod_3 < (Max + 5 \cdot Min)/6)$ |
| | TE3 | $(mod_2 > (5 \cdot Max + Min)/6)$ and $((Max + 5 \cdot Min)/6 < mod3 < (5 \cdot Max + Min)/6)$ and $(mod_1 < (Max + 5 \cdot Min)/6)$ |
| | TE4 | $(mod3 > (5 \cdot Max + Min)/6)$ and $((Max + 5 \cdot Min)/6 < mod2 < (5 \cdot Max + Min)/6)$ and $(mod_1 < (Max + 5 \cdot Min)/6)$ |
| | TE5 | $(mod3 > (5 \cdot Max + Min)/6)$ and $(Max + 5 \cdot Min)/6 < mod_1 < (5 \cdot Max + Min)/6)$ and $(mod2 < (Max + 5 \cdot Min)/6)$ |
| | TE6 | $(mod_1 > (5 \cdot Max + Min)/6)$ and $((Max + 5 \cdot Min)/6 < mod3 < (5 \cdot Max + Min)/6)$ and $(mod2 < (Max + 5 \cdot Min)/6)$ |
| H1 | H1 | $((Max + 5 \cdot Min)/6 < mod_1 < (5 \cdot Max + Min)/6)$ and $((Max + 5 \cdot Min)/6 < mod2 < (5 \cdot Max + Min)/6)$ and $((Max + 5 \cdot Min)/6 < mod3 < (5 \cdot Max + Min)/6)$ |

With Max=+1 and Min=−1, there is obtained:

| Zones | Name | Test |
|---|---|---|
| H3 | TU | $(mod_1 > 2/3)$ and $(-2/3 < mod_2 < 0)$ and $(-2/3 < mod_3 < 0)$ |
| | TI2 | $(mod_3 < -2/3)$ and $(0 < mod_2 < 2/3)$ and $(0 < mod_1 < 2/3)$ |
| | TI3 | $(mod_2 > 2/3)$ and $(-2/3 < mod_3 < 0)$ and $(-2/3 < mod_1 < 0)$ |
| | TI4 | $(mod_1 < -2/3)$ and $(0 < mod_3 < 2/3)$ and $(0 < mod_2 < 2/3)$ |
| | TI5 | $(mod_3 > 2/3)$ and $(-2/3 < mod_1 < 0)$ and $(-2/3 < mod_2 <$ |

-continued

| Zones | Name | Test |
|---|---|---|
| | | 0) |
| | TI6 | ($mod_2 < -2/3$) and ($0 < mod_1 < 2/3$) and ($0 < mod_3 < 2/3$) |
| H4 | TE1 | ($mod_1 > 2/3$) and ($-2/3 < mod_2 < 2/3$) and ($mod_3 < -2/3$) |
| | TE2 | ($mod_2 > 2/3$) and ($-2/3 < mod_1 < 2/3$) and ($mod_3 < -2/3$) |
| | TE3 | ($mod_2 > 2/3$) and ($-2/3 < mod_3 < 2/3$) and ($mod_1 < -2/3$) |
| | TE4 | ($mod_3 > 2/3$) and ($-2/3 < mod_2 < 2/3$) and ($mod_1 < -2/3$) |
| | TE5 | ($mod_3 > 2/3$) and ($-2/3 < mod_1 < 2/3$) and ($mod_2 < -2/3$) |
| | TE6 | ($mod_1 > 2/3$) and ($-2/3 < mod_3 < 2/3$) and ($mod_2 < -2/3$) |
| H1 | H1 | ($-2/3 \leq mod_1 < 2/3$) and ($-2/3 \leq mod_2 < 2/3$) and ($-2/3 \leq mod_3 \leq 2/3$) |

When the set voltage vector $\vec{V^*}$ is in the first zone of the hexagon H1 then the control logic 4 applies steps 70 to 75. When the set voltage vector $\vec{V^*}$ is in the second zone H3 of the hexagon then the control logic 4 applies steps 60 to 64. And when the set voltage vector $\vec{V^*}$ is in the third zone H4 of the hexagon then the control logic 4 applies steps 80 to 85.

Second Zone H3: Double-Carrier Comparison

In steps 60 to 64, the set voltage vector $\vec{V^*}$ is in the second zone H3. In this case, in a fifth step 61), the control logic 4 determines the bridge arm to be inhibited. It depends on the position of the set voltage $\vec{V^*}$ in one of the six internal triangles TIi:

if the set voltage vector $\vec{V^*}$ is in the internal triangle TI1 then the first arm B1 is inhibited at the high state, if the set voltage vector $\vec{V^*}$ is in the internal triangle TI2 then the third arm B3 is inhibited at the low state, if the set voltage vector $\vec{V^*}$ is in the internal triangle TI3 then the second arm B2 is inhibited at the high state, if the set voltage vector $\vec{V^*}$ is in the internal triangle TI4 then the first arm B1 is inhibited at the low state, if the set voltage vector $\vec{V^*}$ is in the internal triangle TI5 then the third arm B3 is inhibited at the high state, if the set voltage vector $\vec{V^*}$ is in the internal triangle TI6 then the second arm B1 is inhibited at the low state, In a sixth step, the control logic 4 determines a quantity of neutral $V_{n0}$ to be injected in the modulants mod1, mod2 and mod3, according to the position of the set voltage vector $\vec{V^*}$. When the bridge arm Bj is to be inhibited at the high state then the control logic determines a quantity of neutral $V_{n0}$=Max−modj. And when the bridge arm Bj is to be inhibited at the low state then the control logic determines a quantity of neutral $V_{n0}$=Min−modj. This step is performed also during step 61 indicated in FIG. 3a. In the examples taken, Max=+1 and Min=−1.

In a seventh step 62), the control logic 4 translates the modulants mod1, mod2 and mod3 by adding a given quantity of neutral $V_{n0}$.

In an eighth step 63), the control logic determines the double carrier. In the non-limitative example in FIG. 5, this double carrier comprises a first carrier 91 in the form of an isosceles triangle, the vertex of which points upwards, and a second carrier 92 in the form of an isosceles triangle whose vertex points downwards, the vertices of the first and second triangles being vertical to each other.

The control logic 4 compares each of the modulants not corresponding to the inhibited arm with only one of the two carriers.

According to this comparison, the control logic 4 determines, in a ninth step 64), the control orders of the three bridge arms of the inverter. The control logic 4 applies to the inverter the succession of control vectors resulting from these control orders, determined at step 64.

First Zone H1: Single-Carrier Comparison, Third Zone H4: Double-Carrier Comparison When the set voltage vector $\vec{V^*}$ is in the first zone H1 or the third zone H4 then the control logic 4 applies the same methods (71 to 73 and 81 to 83) for determining the bridge arm to be inhibited, illustrated in FIG. 3a.

In steps 70 to 75 or 80 to 85, the set voltage vector $\vec{V^*}$ is respectively in the first zone H1 or the third zone H4 of the hexagon. In this case, the control logic 4 determines the bridge arm to be inhibited from a current vector $\vec{V1}$. The inhibiting of a bridge arm will make it possible to reduce the switching losses in the switches.

To this end, at step 71 or 81 in FIG. 3a, in a first non-limitative variant embodiment, the control logic 4 selects firstly two bridge arms, from the three, able to be inhibited according to an order relationship between the three modulants mod1, mod2, mod3 of the three bridge arms, this order relationship being in a non-limitative example a comparison. Thus the two bridge arms selected are the bridge arm having the largest modulant $mod_M$ and the bridge arm having the lowest modulant $mod_m$ according to the comparison of the three modulants, the bridge arm corresponding to the intermediate modulant not being able to be inhibited without inhibiting another arm and thus making it possible to generate on average the set voltage vector $\vec{V^*}$ since only one active control vector and one freewheeling vector would be available.

In a second non-limitative variant embodiment, the control logic 4 selects the two bridge arms able to be inhibited according to a comparison between the three scalar voltage set values V1*, V2* and V3* since, whatever the method of calculating the modulants (here intersective or barycentric), the order relationship between the three modulants is the same as between the three scalar voltage set values because of the relationship that exists between a modulant and the corresponding scalar voltage set value. The two bridge arms selected are the bridge arm having the highest scalar voltage set value and the bridge arm having the lowest scalar voltage set value.

For the rest of the steps, the framework of the first variant is adopted.

The control logic 4, at step 72 or 82, chooses the bridge arm to be inhibited from the two arms selected previously. It determines firstly the phase current $I_M$, for the bridge arm having the highest modulant $mod_m$, and secondly the phase current $I_m$, for the bridge arm having the lowest modulant $mod_m$. In order to determine the bridge arm that will be inhibited, the control logic 4 compares the absolute values of these phase currents $I_M$ and $I_m$. It inhibits the bridge arm where the absolute value of the phase current is the highest in terms of absolute value. If this corresponds to the bridge arm having the highest modulant $mod_M$, then the arm is inhibited at the high state. If this corresponds to the bridge arm having the lowest modulant $mod_m$, then the arm is inhibited at the low state.

At step 73 or 83, the control logic 4 determines a quantity of neutral $V_{n0}$ to be injected in the modulants mod1, mod2 and mod3, according to the result of the comparison.

In the case where the absolute value of the phase current $I_m$ of the smallest modulant $mod_m$ is higher than the absolute value of the phase current $I_M$ of the largest modulant $mod_M$, then the control logic 4 determines a quantity of neutral $V_{n0}$ that is equal to a second minimum value Min minus the smallest modulant $mod_m$. The quantity of neutral $V_{n0}$=Min–$mod_m$. In the non-limitative example taken, the second minimum value Min is equal to –1.

In the contrary case, the control logic 4 determines a quantity of neutral $V_{n0}$ that is equal to a first maximum value Max minus the largest modulant $mod_M$. The quantity of neutral $V_{n0}$=Max–$mod_M$. In the non limitative example taken, the first maximum value Max is equal to +1.

The modulants mod1, mod2 and mod3 are translated by adding this quantity of neutral determined so as to inhibit an arm.

In addition, according to a first non-limitative embodiment, if the absolute value of the phase current $|I_m|$ of the smallest modulant $mod_m$ is equal to the absolute value of the phase current $|I_M|$ of the largest modulant $mod_M$ then the quantity of neutral $V_{n0}$ is equal to $-1-mod_m$. FIG. 3*a* illustrates this first variant.

According to a second non-limitative variant, if the absolute value of the phase current $|I_m|$ of the smallest modulant $mod_m$ is equal to the absolute value of the phase current $|I_M|$ of the largest modulant $mod_M$ then the quantitative neutral $V_{n0}$ is equal to $1-mod_M$.

At step 74 or 84, the control logic 4 compares the translated modulants with a respectively single or double carrier system.

With regard to the single-carrier system (see paragraph on comparison with a single carrier below for more detail), the control logic 4 compares the carrier with the three translated modulants. According to this comparison, the control logic 4 determines, at step 75, the control orders for the three bridge arms of the inverter.

The control logic 4 applies to the inverter the succession of control vectors, representing the control orders, determined at steps 75, so as to generate on average the set voltage vector $\vec{V^*}$ to be applied to the load 3 by the said inverter 1 in order to control the said load.

With regard to the double-carrier system (see paragraph on comparison with a double carrier below for more detail), the control logic 4 compares the carriers with the two translated modulants corresponding to the arms that switch (which must change state), one per arm.

According to this comparison, the control logic 4 determines, at step 85, the control orders or switching functions SC of the three bridge arms of the inverter, so as to generate on average the set voltage vector $\vec{V^*}$ to be applied to the load 3 by the said inverter 1 in order to control the said load.

The control logic 4 applies to the inverter the succession of control vectors, representing the control orders SC, determined at step 85.

These control orders are switching functions SC of the switches of the bridge arms.

It should be noted that, for N=3, knowledge of the phase currents makes it possible to make an optimum choice of the bridge arm to be inhibited in the zones H1 and H4. In the internal triangles, the bridge arm is forced to inhibit without consideration of the level of the phase currents. However, this makes it possible to use the double-carrier system and therefore to reduce the effective current in the decoupling capacitor.

Comparison with a Single Carrier

This paragraph describes in detail the use of a single carrier for determining the control orders to be sent to the bridge arms of the inverter. This single carrier is a signal whose period is the decoupling period. The control logic 4 can also determine as many single carriers as there exist bridge arms. In this case, each modulant of a bridge arm is compared with the corresponding single carrier. These single carriers may be different from one another.

In the example in FIG. 4, the control logic 4 determines just one single carrier for the three bridge arms. This single carrier 90 is a triangle so as to comply with linearity between a modulant and the mean value of the pulse generated on the corresponding arm over the control period Ts for the inverter 1. In the example taken in FIG. 4, this triangle is taken between a first maximum value Max, equal here to 1, and a second value Min, here equal to –1, respectively for the vertex and base. In a non-limitative embodiment, this single carrier 90 is an isosceles triangle. In addition, non-limitatively, the vertex points upwards, i.e. the vertex is situated at the first maximum value Max=+1 and the base is situated at the second minimum value Min=–1.

In another embodiment, this carrier 90 can be any triangle making it possible to modify, though not the width of the pulses, the position of the said pulses in the chopping period or the polarity of the said pulses (vertex pointing downwards).

In another embodiment, the carrier 90 can also be a succession of triangles whose periods is the chopping period Ts of the inverter 1.

This carrier 90 may also be a triangle whose vertex points downwards, i.e. the vertex is situated at the second minimum value Min=–1, and the base is situated at the first maximum value Max=+1.

It should be noted that the chopping period Ts is not necessarily constant when the inverter is used so as to spread the spectrum of the output voltages of the inverter 1, and thereby the period of the carrier also. This spectrum spreading modifies the acoustic noise generated by the polyphase load 3.

FIG. 4 shows the comparison between the single carrier 90 and the three modulants mod1, mod2 and mod3 translated by the quantity of neutral $V_{n0}$.

In FIG. 4, the first timing diagram has axes where the X axis represents the time and the Y axis the standardised voltage values, and the other three timing diagrams have axes where the X axis represents the time and the Y axis the switching functions SC of each of the three bridge arms B1, B2 and B3 respectively.

In the example in FIG. 4, the modulant mod1 is calculated for the bridge arm B1, the modulant mod2 is calculated for the bridge arm B2 and the modulant mod3 is calculated for the bridge arm B3.

The modulant mod3 is, in the example in FIG. 4, the least important modulant between the three modulants and the modulant mod1 is the most important. The largest of the modulants $mod_m$ is equal to the modulant mod1. In this case, the control logic 4 inhibits the bridge arm B1 since the current I1 is higher than the current I3 in absolute value. Because of this, the quantity of neutral to be added to the three modulants is $V_{n0}$=1–mod1. The bridge arm B1 inhibited at the high state has its translated modulant equal to +1.

The bridge arm B1 inhibited at the high state has, at the intersection with the triangular carrier 90, not an interval of time (at the vertex of the carrier, at the intersection of the triangular carrier and the modulant mod1+$V_{n0}$), but rather an intersection at one point, as shown by FIG. 4. The bridge arm B1 therefore does not change state.

The comparison between the carrier 90 and the translated modulants makes it possible to define the succession of control orders SC to be applied to the inverter. Thus the intersection between the translated modulants and the carrier 90 determines a control of the pulse type (rising edge: high switch closes, low switch opens; and falling edge: high switch opens and low switch closes) on each of the bridge arms B2 and B3 to be switched. Because of this, the control logic 4 controls the inverter by a succession of control vectors.

Thus, at time t0, the bridge arm B1 is inhibited at the high state, its modulant translated by the quantity of neutral $V_{n0}$ has a horizontal straight line at +1. At this time t0, the translated modulants of the bridge arms B2 and B3 are situated outside the carrier 90, i.e. do not have an intersection with the said carrier and are situated outside the surface of the triangle formed by the carrier. The switches of these two bridge arms are at the high state. In this interval, the corresponding switching functions are equal to +1. These two arms therefore remain at the high state. They therefore do not change state.

At time t1, the modulant mod3+$V_{n0}$ comes into contact with one of the sides of the carrier 90. The control logic 4 sends to the bridge arm B3 a control order SC. This control order switches the bridge arm B2. The bridge arm B3 changes state and therefore goes to the low state.

At time t2, the modulant mod2+$V_{n0}$ comes into contact with one of the sides of the carrier 90. The control logic 4 sends to the bridge arm B2 a control order SC. This control order switches the bridge arm B2. The bridge arm B2 therefore changes state and goes to the low state.

In the interval t2 to t3, the modulant mod2+$V_{n0}$ is situated in the triangle of the carrier 90, i.e. does not have any intersection with the said carrier and is situated inside the surface of the triangle formed by the carrier. Throughout the whole of this period the bridge arm B2 remains at the low state.

At time t3, the modules mod2+$V_{n0}$ once again comes into contact with another of the sides of the carrier 90. As from this moment, the control logic 4 sends a control order SC to the bridge arm B2. This control order switches the bridge arm B2 to the high state.

In the interval t1 to t4 the modulant mod3+$V_{n0}$ is situated in the triangle of the carrier 90. Throughout the whole of this period the bridge arm B3 remains at the low state.

At time t4, the modulant mod3+$V_{n0}$ once again comes into contact with another of the sides of the carrier 90. As from this moment, the control logic 4 sends to the bridge arm B3 a control order SC. This control order switches the bridge arm B3 to the high state.

Comparison with a Double Carrier

This paragraph describes in detail the use of a double carrier for determining the control orders to be sent to the bridge arms of the inverter. In the example in FIG. 5, this double carrier is composed of a first carrier 91 in the form of an isosceles triangle, the vertex and base of which are situated respectively at a first maximum value Max=+1 and a second minimum value Min=−1, and a second carrier 92 in the form of an isosceles triangle, the base and vertex of which are situated respectively at a first maximum value Max=+1 and a second minimum Min=−1.

FIG. 5 shows the comparison between the double carrier 91, 92 and the three modulants mod1, mod2 and mod3 translated by the quantity of neutral $V_{n0}$. In the example in FIG. 5, the modulant mod1 is calculated for the bridge arm B1, the modulant mod2 is calculated for the bridge arm B2 and the modulant mod3 is calculated for the bridge arm B3. The modulant mod3 is, in the example in FIG. 5, the least important modulant between the three modulants. A bridge arm is inhibited, here the first arm B1, and does not change state during the period of the microprocessor. Thus the comparison of its associated modulant with the carrier or carriers does not define a change of state for this arm. The other two remaining bridge arms B2 and B3 have their modulants each compared with a different carrier, a carrier 91 of the triangular type, the vertex and base of which are situated respectively at a first maximum value Max=+1 and a second minimum value Min=−1, and another carrier 92 of the triangular type, the base and vertex of which are situated respectively at a first maximum value Max=+1 and a second minimum value Min=−1.

One carrier or the other can indifferently be associated with a modulant, relating to an arm that switches, without modifying the result sought. In the example in FIG. 5, the control logic 4 modulates the arm B2 with the carrier 91 and the other arm B3 of the bridge that switches with the carrier 92. These choices could of course have been reversed.

In the case of the example in FIG. 5, the control logic 4 inhibits the bridge arm B1 at the high state. Because of this, the quantity of neutral to be added to the three modulants is $V_{n0}$=1−mod1. The inhibited bridge arm B1 has its translated modulant equal to +1.

The translated modulant of the inhibited bridge arm B1 has, at the intersection with the triangular carrier whose vertex points upwards, not an interval of time but rather an intersection at one point, as shown by FIG. 5. The bridge arm B1 therefore does not change state. It should be noted that, whatever the carrier used, the intersection between the carrier and the translated modulant is only at one point and consequently the corresponding arm always remains inhibited.

In this example in FIG. 5, the bridge arm B2 is compared with the carrier 91 while the bridge arm B3 is compared with the carrier 92.

At time t0, the translated modulant of the bridge arm B2 is situated outside the carrier 91, here the bridge arm B2 is at the high state. The translated modulant of the bridge arm B3 is situated outside the triangular carrier 92 whose vertex points downwards. Here the bridge arm B3 is at the low state.

At time t1, the modulant mod2+$V_{n0}$ comes into contact with one of the sides of the carrier 91. The control logic 4 sends to the bridge arm B2 a control order SC. This control order switches the bridge arm B2. The bridge arm B2 goes to the low state.

At time t2, the modulant mod3+$V_{n0}$ comes into contact with one of the sides of the carrier 92. The control logic 4 sends to the bridge arm B3 a control order SC. This control order switches the bridge arm B3. The bridge arm B3 goes to the high state.

In the interval t2 to t3, the modulant mod3+$V_{n0}$ is situated in the triangle of the carrier 92. Throughout this period the bridge arm B3 remains at the high state.

At time t3, the modulant mod3+$V_{n0}$ once again comes into contact with another of the sides of the carrier 92. As from this moment, the control logic 4 sends to the bridge arm B3 a control order SC. This control order switches the bridge arm B3 to the low state.

In the interval t1 to t4, the modulant mod2+$V_{n0}$ is situated in the triangle of the carrier 91. Throughout the whole of this period the bridge arm B2 remains at the low state.

At time t4, the modulant mod2+$V_{n0}$ once again comes into contact with another of the sides of the carrier 91. As from this moment, the control logic 4 sends a control order SC to the bridge arm B2. This control order switches the bridge arm B2 to the high state.

It should be noted that this technique of movement of the quantity of neutral $V_{n0}$ makes it possible to reduce the stresses on the inverter 1 in terms of losses (since there is always one arm inhibited and the losses are thereby saved on by switching in these arms), by making a simple intersection between the new translated modulants. This reduction in the stresses on the inverter 1 limits the switching losses. This is valid for the single carrier or the double carrier.

Finally, the use of a double carrier makes it possible to reduce even further the effective current in the filtering capacitor and consequently to stabilise the voltage Udc upstream of the inverter and therefore to reduce the size of the decoupling capacitor 7 on the DC side since a freewheeling vector is no longer used.

It should be noted that the establishment of the control orders SC by the method of intersection between a modulant and a triangular carrier means that the control orders SC of the inverter are two-state. Moreover, according to the value of the modulant, the width of the resulting pulses is variable. There is therefore a pulse width modulation and therefore a control of the inverter by PWM. This is what was seen in FIGS. 4 and 5.

It should be noted that, in all cases where a comparison is made with a double carrier, it is naturally possible, instead, to make a comparison with a single carrier, but this is less advantageous, in particular for reducing the effective current in the capacitor.

Moreover, in the case where a comparison is made with a single carrier (zone H1 for N=2 or 3), it is also possible, instead, to make a comparison with a double carrier. However, there will always be a freewheeling vector used.

Finally, the method of the invention described functions both in continuous regime and in dynamic regime. This is because this functions in dynamic regime since no account is taken of the change over time in the phase currents. They are looked at just at one moment. The functioning is therefore here discrete.

The invention claimed is:

1. Method of controlling a power bridge (1) intended to control an electrical load (3) comprising several phases, the power bridge (1) being intended to be connected to the electrical load (3) via several arms (B1, ..., B3), at least one per phase, and being intended to be controlled by switching functions (SC1, SC2, SC3), the said switching functions determining control vectors ($\vec{V0}, ..., \vec{V7}$) for controlling the load, the said control vectors ($\vec{V0}, ..., \vec{V7}$) being subdivided into freewheeling control vectors ($\vec{V0}, \vec{V7}$) and active control vectors ($\vec{V1}, ..., \vec{V6}$), characterised in that the method comprises the steps of:

selecting a first method of producing switching functions that produces a reduced number of combinations of switching functions corresponding to freewheeling control vectors ($\vec{V0}, \vec{V7}$) or a second method of producing switching functions that produces solely combinations of switching functions corresponding to active control vectors ($\vec{V1}, ..., \vec{V6}$), the said methods being defined according to a given set voltage vector ($\vec{V^*}$) and comprising a step of determining a modulant (mod1, mod2, mod3) associated with each arm of the bridge from scalar voltage set values (V1*, V2*, V3*) and applying the said selected method for producing a succession of control vectors from combinations of switching functions produced.

2. Method of controlling a power bridge (1) according to claim 1, characterised in that the selection of a method of producing switching functions is based on a positioning of a set voltage vector ($\vec{V^*}$) in an area (H) of a domain of the plane defined by control vectors ($\vec{V0}, ..., \vec{V7}$), the set voltage vector ($\vec{V^*}$) being determined from scalar voltage set values (V1*, V2*, V3*).

3. Method of controlling a power bridge (1) according to claim 2, characterised in that the domain of the plane is divided into first and second zones (H1, H2) and in that the first method of producing switching functions is selected if the set voltage vector ($\vec{V^*}$) is positioned in the first zone (H1), and in that the second method of producing switching functions is selected if the set voltage vector ($\vec{V^*}$) is positioned in the second zone (H2).

4. Method of controlling a power bridge (1) according to claim 3, characterised in that the domain of the plane is defined in a stator reference frame, the said stator reference frame being subdivided into angular sectors (SA) and in that a method of producing switching functions also comprises a step of determining a bridge arm to be inhibited in a high state or a low state according to the position of the set voltage vector ($\vec{V^*}$) in one of the angular sectors (SA).

5. Method according to claim 4, characterised in that:

if the set voltage vector ($\vec{V^*}$) is in a first angular sector (SA1) then the first arm (B1) is inhibited at the high state, if the set voltage vector ($\vec{V^*}$) is in a second angular sector (SA2) then the third arm (B3) is inhibited at the low state, if the set voltage vector ($\vec{V^*}$) is in a third angular sector (SA3) then the second arm (B2) is inhibited at the high state, if the set voltage vector ($\vec{V^*}$) is in a fourth angular sector (SA4) then the first arm (B1) is inhibited at the low state, if the set voltage vector ($\vec{V^*}$) is in a fifth angular sector (SA5) then the third arm (B3) is inhibited at the high state, if the set voltage vector ($\vec{V^*}$) is in a sixth angular sector (SA6) then the second arm (B2) is inhibited at the low state.

6. Method of controlling a power bridge (1) according to claim 2, characterised in that the domain of the plane is divided into first (H1), second (H3) and third (H4) zones and in that the first method of producing switching functions is selected if the set voltage vector ($\vec{V^*}$) is positioned in the first zone (H1).

7. Method of controlling a power bridge (1) according to claim 6, characterised in that the domain of the plane is divided into first (H1), second (H3) and third (H4) zones and in that the second method of producing switching functions is selected if the set voltage vector ($\vec{V^*}$) is positioned in the second zone (H3) or third zone (H4).

8. Method of controlling a power bridge (1) according to claim 6, characterised in that the second zone (1-13) determines internal triangles (TIi) and in that a method of producing switching functions also comprises a step of determining an arm to be inhibited in a high state or a low state according to the position of the set voltage vector in one of the internal triangles (TIi).

9. Method of controlling a power bridge (1) according to claim 8, characterised in that:
if the set voltage vector ($\vec{V^*}$) is in a first internal triangle (TI1) then the first arm (B1) is inhibited at the high state,
if the set voltage vector ($\vec{V^*}$) is in a second internal triangle (TI2) then the third arm (B3) is inhibited at the low state,
if the set voltage vector ($\vec{V^*}$) is in a third internal triangle (TI3) then the second arm (B2) is inhibited at the high state,
if the set voltage vector ($\vec{V^*}$) is in a fourth internal triangle (TI4) then the first arm (B1) is inhibited at the low state,
if the set voltage vector ($\vec{V^*}$) is in a fifth internal triangle (TI5) then the third arm (B3) is inhibited at the high state,
if the set voltage vector ($\vec{V^*}$) is in a sixth internal triangle (TI6) then the second arm (B2) is inhibited at the low state.

10. Method of controlling a power bridge (1) according to claim 6, characterised in that a method of producing switching functions also comprises a step of selecting at least two bridge arms able to be inhibited according to an order relationship.

11. Method of controlling a power bridge (1) according to claim 10, characterised in that the order relationship is a comparison between the modulants (mod1, mod2, mod3) associated with the bridge arms (B1, B2, B3).

12. Method of controlling a power bridge (1) according to claim 11, characterised in that the bridge arms selected correspond to the bridge arms having the highest modulant ($mod_M$) and the smallest modulant ($mod_M$).

13. Method of controlling a power bridge (1) according to claim 10, characterised in that the bridge arm to be inhibited is chosen from the bridge arms selected and is the one that has the highest phase current ($I_M$, $I_m$) in absolute value among the phase currents corresponding respectively to a largest of the modulants ($mod_M$) and a smallest of the modulants ($mod_m$) among the modulants (mod1, mod2, mod3) associated with the bridge arms (B1, B2, B3).

14. Method of controlling a power bridge (1) according to claim 13, characterised in that, if the bridge arm to be inhibited is the one corresponding to the largest of the modulants, then the bridge arm is inhibited at the high state, and if the bridge arm to be inhibited is the one corresponding to the smallest of the modulants, then the bridge arm is inhibited at the low state.

15. Method of controlling a power bridge (1) according to claim 1, characterised in that a method of producing switching functions comprises a step of comparing modulants translated by a quantity of neutral with a carrier, a modulant being associated with each bridge arm, the said comparison defining switching functions (SC) for controlling the said bridge.

16. Method of controlling a power bridge (1) according to claim 15, characterised in that the method of producing switching functions is the first method of producing switching functions and the carrier is a single carrier.

17. Method according to claim 16, characterised in that a single carrier is an isosceles triangle comprising a vertex situated at a maximum value (Max) and a base situated at a minimum value (Min).

18. Method of controlling a power bridge (1) according to claim 15, characterised in that the method of producing switching functions is the second method of producing switching functions and the carrier is a double carrier.

19. Method according to claim 18, characterised in that a double carrier comprises two single carriers (91, 92) and in that at least one modulant is compared with only one of the carriers of the double carrier.

20. Method of controlling a power bridge (1) according to claim 15, characterised in that a method of producing switching functions also comprises a step of determining a quantity of neutral ($V_{n0}$) to be added to a modulant according to a high or low state of a bridge arm to be inhibited.

21. Method of controlling a power bridge (1) according to claim 20, characterised in that:
if an arm (Bj) is to be inhibited at the high state then the quantity of neutral ($V_{n0}$) is equal to a first maximum value (Max) minus the modulant associated with the said arm ($V_{n0}$=Max−$mod_j$), and
if the arm ($B_j$) is to be inhibited at the low state then the quantity of neutral ($V_{n0}$) is equal to a second minimum value (Min) minus the modulant associated with said arm ($V_{n0}$=Min−$mod_j$).

22. Method of controlling a power bridge (1) according to claim 1, characterised in that the determination of a modulant is carried out according to an intersective strategy.

23. Method of controlling a power bridge (1) according to claim 1, characterised in that the determination of a modulant is carried out according to a barycentric strategy.

24. Method of controlling a power bridge (1) according to claim 1, characterised in that a method of producing switching functions also comprises a step of inhibiting a bridge arm throughout a chopping period (Ts) of the power bridge (1).

25. Device for controlling a power bridge intended to be connected to an electrical load (3) via a bus (2) for implementing the said method according to claim 1, characterised in that it comprises a control logic (4), the power bridge being intended to be connected to a control logic (4), the control logic (4) implementing the said method.

26. Rotary electrical machine comprising:
a polyphase electrical load (3),
a voltage source (5),
a power bridge intended to be connected downstream to the electrical load (3) via a bus (2), and upstream to the voltage source (5),
a decoupling capacitor (7) being disposed in parallel to the bus (2), and
a device for controlling the power bridge according to claim 25.

27. A rotary electrical machine according to claim 26, characterised in that the decoupling capacitor (7) is close to the power bridge and is of low capacitance.

* * * * *